US011893455B1

(12) United States Patent
Griffin et al.

(10) Patent No.: US 11,893,455 B1
(45) Date of Patent: Feb. 6, 2024

(54) OPTIMIZING QUANTUM TELEPORTATION AS A SERVICE

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/870,601

(22) Filed: Jul. 21, 2022

(51) Int. Cl.
*G06N 10/60* (2022.01)
*G06F 13/42* (2006.01)

(52) U.S. Cl.
CPC ............ *G06N 10/60* (2022.01); *G06F 13/42* (2013.01); *G06F 2213/40* (2013.01)

(58) Field of Classification Search
CPC ...... G06N 10/60; G06F 13/42; G06F 2213/40
See application file for complete search history.

(56) References Cited

U.S. PATENT DOCUMENTS

| 10,817,337 | B1 | 10/2020 | Richardson et al. |
| 11,290,368 | B2 | 3/2022 | Griffin et al. |
| 11,366,787 | B2 | 6/2022 | Griffin et al. |
| 11,601,266 | B1 * | 3/2023 | Stapleton ............... G06N 10/00 |
| 2011/0296068 | A1 * | 12/2011 | Fredenberg ......... G06F 13/1615 710/120 |
| 2021/0374583 | A1 | 12/2021 | Griffin et al. |
| 2022/0051121 | A1 | 2/2022 | Griffin et al. |

OTHER PUBLICATIONS

Nancy A. Angel et al., "Recent Advances in Evolving Computing Paradigms: Cloud, Edge, and Fog Technologies", Dec. 28, 2021, MDPI, Sensors, 2021, vol. 22(1), 38 pages (Year: 2021).*
Francesco Chiti et al., "Towards the Quantum Internet: Satellite Control Plane Architectures and Protocol Design", Jul. 30, 2021, MDPI, Future Internet, 2021, vol. 13(8), 14 pages (Year: 2021).*
X. Fu et al., "A Heterogeneous Quantum Computer Architecture", 2016, Proceedings of the ACM International Conference on Computing Frontiers, pp. 323-330 (Year: 2016).*
Houshmand, M. et al., "An Evolutionary Approach to Optimizing Teleportation Cost in Distributed Quantum Computation," International Journal of Theoretical Physics, doi.org/10.1007/s10773-020-04409-0, Feb. 27, 2020, 15 pages.

(Continued)

*Primary Examiner* — Henry Tsai
*Assistant Examiner* — John B Roche
(74) *Attorney, Agent, or Firm* — Dority & Manning, P.A.

(57) ABSTRACT

A method for providing teleportation services includes receiving, by a computing device, a first signal. The first signal indicates a request for a teleportation event between a first quantum computing system (QCS) and a second QCS. A first set of qubits is associated with the first QCS. A second set of qubits is associated with the second QCS. In response to receiving the first signal, the computing device causes an allocation of a first qubit of the first set of qubits for the teleportation event. In response to receiving the signal, the computing device causes an allocation of a second qubit of the second set of qubits for the teleportation event. The computing device receives a second signal that indicates a successful completion of the teleportation event. In response to receiving the second signal, the computing system causes a deallocation of the first qubit of the first set of qubits.

20 Claims, 13 Drawing Sheets

(56) References Cited

OTHER PUBLICATIONS

Isailovic, N. et al., "Interconnection Networks for Scalable Quantum Computers," International Symposium on Computer Architecture 2006 (ISCA 2006), arxiv.org/pdf/quant-ph/0604048.pdf, Apr. 7, 2006, 13 pages.

Mina, M. et al., "EntangleNet: Theoretical Reestablishment of Entanglement in Quantum Networks," Applied Sciences, Oct. 16, 2018, 17 pages.

Schoute, E. et al., "Shortcuts to Quantum Network Routing," obj.umiacs.umd.edu/extended_abstracts/QCrypt_2016_paper_203.pdf, Jul. 8, 2016, 2 pages.

* cited by examiner

OPTIMIZING QUANTUM TELEPORTATION AS A SERVICE

BACKGROUND

Quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit.

SUMMARY

The examples disclosed herein are directed towards providing optimized teleportation services. In one non-liming implementation, a method for providing teleportation services includes receiving, by a computing device, a first signal. The first signal may indicate a request for a teleportation event between a first quantum computing system (QCS) and a second QCS. A first set of qubits may be associated with the first QCS. A second set of qubits may be associated with the second QCS. In response to receiving the first signal, the computing device may cause an allocation of a first qubit of the first set of qubits for the teleportation event. In response to receiving the first signal, the computing device may cause an allocation of a second qubit of the second set of qubits for the teleportation event. The computing device may receive a second signal that indicates a successful completion of the teleportation event. In response to receiving the second signal, the computing system may cause a deallocation of the first qubit of the first set of qubits.

Another implementation includes a computing system. The computing system may include a memory and a processor device coupled to the memory. The computing system may be configured to receive a first signal. The first signal may indicate a request for a teleportation event between a first quantum computing system (QCS) and a second QCS. A first set of qubits may be associated with the first QCS. A second set of qubits may be associated with the second QCS. In response to receiving the first signal, the computing system may cause an allocation of a first qubit of the second set of qubits for the teleportation event. In response to receiving the first signal, the computing system may cause an allocation of a second qubit of the second set of qubits for the teleportation event. The computing system may receive a second signal that indicates a successful completion of the teleportation event. In response to receiving the second signal, the computing system may cause a deallocation of the first qubit of the first set of qubits.

In still other implementations, a non-transitory computer-readable storage medium includes executable instructions. The executable instructions may cause a processor device to receive a first signal. The first signal may indicate a request for a teleportation event between a first quantum computing system (QCS) and a second QCS. A first set of qubits may be associated with the first QCS. A second set of qubits may be associated with the second QCS. In response to receiving the first signal, the processor device may cause an allocation of a first qubit of the second set of qubits for the teleportation event. In response to receiving the first signal, the processor device may cause an allocation of a second qubit of the second set of qubits for the teleportation event. The processor device may receive a second signal that indicates a successful completion of the teleportation event. In response to receiving the second signal, the processor device may cause a deallocation of the first qubit of the first set of qubits.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
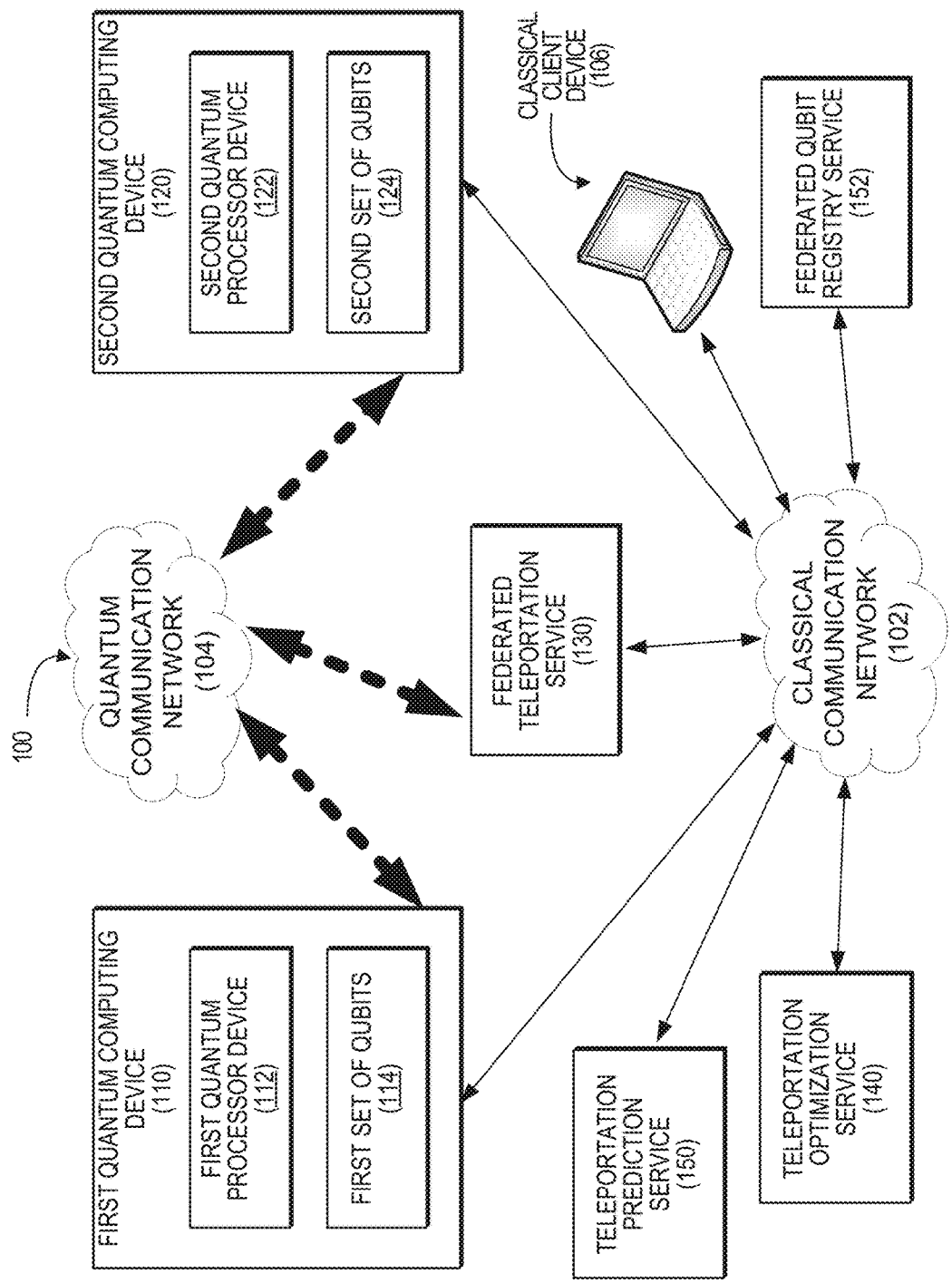
FIG. 1A is a block diagram of a computing system in which optimizing quantum teleportation as a service may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum computing device" and "second quantum computing device," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such as superposition and entanglement) that differ from those of classical (i.e., non-quantum) bits used in classical computing. Qubits may be employed by quantum services that are executed by quantum computing systems that include one or more quantum computing devices. Quantum computing devices also execute quantum core services (QCSs), which are operating-system-level services that provide functionality for managing and facilitating the use of qubits and the execution of quantum services. These QCSs may include, as non-limiting examples, a qubit registry, a quantum task manager, a quantum process scheduler, a qubit monitor, and/or optimized teleportation service, examples of which are discussed in greater detail below.

Quantum teleportation refers to "teleporting" (or transferring) a quantum state from a first qubit to a second qubit. The second qubit may be remote from the first qubit. Due to the complexity of many tasks required for quantum teleportation, providing quantum teleportation services to the general population poses many challenges. Conventional teleportation requires the selection and allocation of available qubits, as well as manipulating those qubits in specific ways based on one or more "quantum" measurements made on the qubits. After teleportation, at least some of the qubits may be deallocated and made available to other processes of a quantum computing system (QCS). Conventionally, these and other complex tasks associated with teleportation are carried out by highly trained professionals. The supply of such professionals is finite, which increases the difficulty in scaling out the availability of teleportation. To overcome such challenges, the implementations herein provide an optimized quantum teleportation service that is highly scalable to large populations of users and qubit locations. In addition to being scalable, the optimized teleportation service provides efficiency for the QCS implementing the implementations. For instance, efficiencies are realized with regards to qubit utilization and the time required to successfully perform a teleportation event is drastically reduced.

More specifically, quantum teleportation involves the allocation and manipulation of at least three qubits of the QCS. In various implementations, two of the three qubits are located at a first location of the QCS, while the other qubit is located at a second location that is remote from the first location. For consistency purposes, the two qubits located at the first location may be referred to as the first qubit and the third qubit. The qubit located at the second location may be referred to as the second qubit. The first and second qubits (e.g., located at separate locations) may form a teleportation qubit pair. The third qubit (e.g., co-located with the first qubit) may be referred to as the payload qubit. In non-limiting implementations, the quantum state of the payload qubit is teleported to the second qubit. Thus, a quantum state of a qubit located at the first location is teleported to a qubit located at the second location. In some implementations, the two locations may be spatially separated by large distances (e.g., separate cities, states, countries, continents, planets, and/or galaxies). In other implementations, the two locations may be spatially separated by much smaller distances (e.g., separate qubit registers in the same quantum computation device (QCD). Components of the QCS (e.g., qubits) are located in each of the first and second locations.

The implementations select and allocate at least two of the three qubits for the teleportation event. More specifically, the implementations select and allocate at least the first and second qubits, which form a teleportation qubit pair. In the various implementations, the first qubit is located at the first location, while the second qubit is located at the (remote) second location. In at least one implementation, the third qubit (e.g., the payload qubit) may be co-located with the first qubit. In some implementations, the third qubit is selected and allocated. In other implementations, the third qubit (e.g., the payload qubit) may already be allocated to an ongoing computational task of the QCS.

Once selected and allocated, the three qubits may be manipulated, via quantum gates, in a specific manner. After the initial manipulations, quantum measurements may be made on the two qubits located at the first location (e.g., the first qubit and the third qubit). At the first location, the results of the quantum measurements are encoded in classical bits of information. The classical information is then sent to and received at the second location. Based on the quantum measurements encoded in the classical information, a specific sequence of quantum manipulations is selected at the second location. The selected sequence of quantum manipulations is performed on the second (non-measured) qubit. After the selected manipulations are performed on the second qubit (at the second location), the quantum state of the second qubit is equivalent to a quantum state associated with the third (or payload) qubit at the first location. The quantum state that is teleported to the second qubit is the quantum state of the third (or payload) qubit prior to the quantum measurement of the third qubit. The various implementations provide solutions for efficiently implementing these and other complex tasks associated with teleportation.

The implementations may include a teleportation service that receives and carries out teleportation requests from users. The teleportation service may be included in and/or may access one or more QCSs. The teleportation service may manage teleportation events between any two quantum computing devices (QCDs) included in the one or more QCSs. At noted throughout, the two QCDs (e.g., two separate qubit registers) may, but need not, be remotely located from one another. After receiving a request for a teleportation event, the teleportation service may initiate various tasks to carry-out the requested teleportation event. Because the teleportation service provides teleportation services to clients of the service, the teleportation service may be referred to as Teleportation as a Service (TaaS). The TaaS may automate some of the quantum teleportation-associated tasks discussed above.

The implementations may additionally include a teleportation optimization service (TOS) and a qubit registry service. The TOS may assist the TaaS in carrying-out its various functionalities. That is, the TOS may provide optimal (or at least approximately optimal) services to the TaaS. More specifically, upon receipt of a request for a teleportation event, TOS may initiate and/or coordinate a selection and allocation of currently available qubits for the event. In carrying-out its functionalities, the TOS may leverage the functionalities of the qubit registry service. The qubit registry service may track (via a qubit allocation table), the allocations, utilizations, and deallocation of qubits within the QCS. Thus, the TOS may consult the qubit registry service when selecting, allocating, and deallocating qubits.

The TOS may initiate the entanglement of the qubits allocated for the event. After the teleportation, the TOS may cause a deallocation of at least some of the qubits. Because the management (e.g., selection, allocation, entanglement, and deallocation) of qubits is dynamically performed in real-time, based on the temporally variable demand for services, a utilization of the qubits of the QCS is at least approximately optimized. Accordingly, the TOS may serve to significantly optimize the functionality of TaaS.

FIG. 1A is a block diagram of a quantum computing system (QCS) 100 in which examples may be practiced. Computing system 100 is enabled to provide optimized quantum teleportation services to users of classical client device 106. As such, QCS 100 includes at least a first quantum computing device (QCD) 110 and a second QCD 120. The first QCD 110 may include a first quantum processor device (QPD) 112 and a first set of qubits 114 (e.g., a first qubit register). The first set of qubits 114 may include one or more qubit registers. Similarly, the second QCD 120 may include a second quantum processor device 122 and a second set of qubits 124 (e.g., a second qubit register). The second set of qubits 124 may include one or more qubit registers.

The implementations may include a teleportation service that receives and carries out teleportation requests from users. As shown in FIG. 1A, the teleportation service may be a federated teleportation service (e.g., federated teleportation service 130). As discussed in conjunction with at least FIG. 1B, in other implementations, each QCD may implement its own teleportation service. The teleportation service may be included in and/or may access one or more QCSs and/or QCDs. The teleportation service may manage teleportation events between any two QCDs (e.g., first QCD 110 and second QCD 120) included in the one or more QCSs (QCS 100). At noted throughout, the two QCDs (e.g., two separate qubit registers) may, but need not, be remotely located from one another. After receiving a request for a teleportation event, the teleportation service may initiate various tasks to carry-out the requested teleportation event. Because the teleportation service provides teleportation services to clients of the service, the teleportation service may be referred to as Teleportation as a Service (TaaS). The TaaS may automate some of the quantum teleportation-associated tasks discussed above.

The implementations may additionally include a teleportation optimization service (TOS) (e.g., TOS 140) and a qubit registry service (e.g., federated qubit registry service 152). The TOS may assist the TaaS in carrying-out its various functionalities. That is, the TOS may provide optimal (or at least approximately optimal) services to the TaaS. More specifically, upon receipt of a request for a teleportation event, TOS may initiate and/or coordinate a selection and allocation of currently available qubits for the event. In carrying-out its functionalities, the TOS may leverage the functionalities of the qubit registry service. The qubit registry service may track (via a qubit allocation table), the allocations, utilizations, and deallocation of qubits within the QCS. Thus, the TOS may consult the qubit registry service when selecting, allocating, and deallocating qubits.

The TOS may initiate the entanglement of the qubits allocated for the event. After the teleportation, the TOS may cause a deallocation of at least some of the qubits. Because the management (e.g., selection, allocation, entanglement, and deallocation) of qubits is dynamically performed in real-time, based on the temporally variable demand for services, a utilization of the qubits of the QCS is at least approximately optimized. Accordingly, the TOS may serve to significantly optimize the functionality of TaaS.

The implementations may additionally include a teleportation prediction service (TPS) (e.g., TPS 150). The TPS may train and implement a teleportation prediction model. The teleportation prediction model may be trained to predict upcoming teleportation requests based on historical usage patterns (e.g., encoded in historical training data). For example, based on the training data, the model may be trained to recognize usage patterns in the users of the TaaS. The training may occur at the individual user level, a user group level, and/or at the level of the entire population of users. Once sufficiently trained, the model is enabled to predict likely future requests, based on the historical usage patterns. The TPS may provide such predictions to the TOS. The TOS may prepare (e.g., selection, allocation, and entanglement of) the qubits for the likely future requests, prior to the user sending the actual request. In this way, the TOS provides additional efficiency for users of the TaaS.

In various implementations, the TOS may operate to allocate and form a reserved "pool" of teleportation pairs. Depending on system constraints, the pool of teleportation qubit pairs may include N pairs allocated qubits, where N is any positive integer. As a reminder, a teleportation qubit pair may include the first and second qubits, which are located at separate locations. The third qubit (e.g., the payload qubit) may be co-located with the first location.

The pool of reserved teleportation qubit pairs is available to serve teleportation requests from clients of the TaaS. The pool may serve to provide teleportation qubit pairs to the TaaS, as a "just in time" inventory or supply chain of teleportation qubit pairs. When a teleportation request is received at the TaaS, the TOS may make a teleportation qubit pair available to the TaaS to serve the request (e.g., either an actual request originating from a client or a predicted request for a predicted teleportation event). After the TaaS employs the teleportation qubit pair, the pool may have N−1 available teleportation qubit pairs. The TOS may allocate and add another teleportation qubit pair to the pool such that the pool maintains N available teleportation qubit pairs at all times.

In various implementations, the value of N may be temporally constant. In other implementations, the value of N may vary in time, as the actual and/or predicted utilization of teleportation services vary in time. The TOS may form, maintain, and track the reserved pool of teleportation qubit pairs via a teleportation qubit pair registry and/or table. In some implementations, the TOS may generate an entanglement (e.g., a Bell state) of the first and second qubits of a teleportation qubit pair at the time of the allocation and formation of the qubit pair. In other implementations, due to the fragility of the Bell state, the TOS may wait until the time that the teleportation qubit pair is actually to be employed by the TaaS to generate the Bell state of the qubit pair.

More specifically, in the non-limiting implementations of FIG. 1A, a user of classical client device 106 may transmit a request for a teleportation event to the federated teleportation service 130. The request may indicate the first QCD 110 and/or a payload qubit of the first set of qubits 114. In at least one implementation, the request may indicate the quantum state of the payload qubit of the first QCD 110 that is to be teleported to an available qubit of the second QCD 120 (e.g., a qubit of the second set of qubits 124 that is currently available). In another implementation, the request may indicate the second QCD 120 and/or the qubit of the second set of qubits 124 that is to receive the teleported quantum state.

In addition to the first QCD 110, the second QCD 120, and the classical client device 106, the QCS 100 may include a federated teleportation service 130, a teleportation optimization service (TOS) 140, a teleportation prediction service (TPS) 150, and a federated qubit registry service (QRS) 152. The federated teleportation service 130 may be referred to a Teleportation as a Service (TaaS) 130. The first QCD 110, the second QCD 120, and the federated TaaS 130 may be communicatively coupled via a quantum communication network 104.

The quantum communication network 104 provides quantum channels between the first QCD 110, the second QCD 120, and the federated TaaS 130. The quantum channels are represented by the "thick" hashed lines of FIG. 1A. One or more qubits may be entangled, exchanged, and/or otherwise manipulated over such quantum channels. QCS 100 may also include a classical communication network 102. Classical communication network 102 communicatively couples the first QCD 110, the second QCD 120, the federated TaaS 130, the TOS 140, the TPS 150, the federated qubit registry service 152, and the classical client device 106.

As noted above, a teleportation event may require three qubits. The three qubits include a first qubit (often referred to as qubit_A or Alice's qubit), a second qubit (e.g., often referred to as qubit_B, Bob's qubit, or a target qubit), and a third qubit (often referred to as a payload qubit or a source qubit). A teleportation event may include "teleporting" a quantum state of the payload qubit to the second qubit. Because the quantum state of the payload qubit is teleported to the second qubit, the payload qubit may be referred to as the source qubit and the second qubit (e.g., qubit_B or Bob's qubit) may be referred to as the target qubit. The quantum state of the payload qubit (prior to teleportation) may be referred to as the payload state or source state. The target and payload qubits may be co-located within a relatively small region of space (e.g., within the same QCD or separated by a large spatial distance (e.g., located in separate QCDs). Prior to the teleportation, the payload qubit may be a quantum state corresponding to a specific superposition of two eigenstates that are associated with a measuring apparatus of the QCS 100.

Although not shown explicitly in FIG. 1A, each of first QCD 110 and second QCD 120 may include a qubit measuring apparatus associated with equivalent eigenstates of the qubits. The qubit measuring apparatus of a QCD is enabled to "read" or "measure" the state of the qubits of the QCD. Note that reading or measuring a qubit "collapses" the wavefunction of the qubit such that, upon measurement, the qubit is in a "pure" quantum state (e.g., a state that is consistent with either the first eigenstate or the second eigenstate, but not consistent with a superposition of the two eigenstates).

The two eigenstates may be "orthogonal" quantum states and include a first eigenstate and a second eigenstate. After a successful teleportation, the payload qubit is in a "pure" quantum state (e.g., a quantum state that is exclusively the first eigenstate or exclusively the second eigenstate) and the target qubit is in a quantum state that is equivalent to the quantum state of the payload qubit prior to transportation (e.g., the quantum state corresponding to the specific superposition of the two eigenstates associated with the measuring apparatus).

In a non-limiting example of a teleportation event, the first and second qubits are initially prepared in an entangled quantum state. The third qubit is in a payload quantum state (e.g., a state of superposition with respect to the measuring apparatus of QCS 100) that is to be teleported to the second qubit. After the teleportation event, the first qubit and the payload qubit are in "pure" quantum states (e.g., a non-superposition states with respect to the measuring apparatus), while the second qubit is in the payload quantum state associated with the payload qubit prior to the teleportation event. Because the first and second qubits are initially prepared in an entangled state (e.g., a Bell state) for the teleportation event, the first and second qubits are in a correlated pair of qubits. The entangled pair of the first and second qubits may be referred to as an "entangled pair" of qubits, or simply a "teleportation qubit pair."

In non-limiting implementations, the first qubit (e.g., qubit_A) and the payload qubit may be qubits of the first QCD 110 (e.g., qubits included in the first set of qubits 114) and the second qubit (e.g., qubit_B) may be a qubit of the second QCD 120 (e.g., Bob's qubit is included in the second set of qubits 124). Thus, the first QCD 110 may be referred to as Alice's QCD 110 and the second QCD 120 may be referred to as Bob's QCD 120. In such implementations, a quantum state (e.g., the payload quantum state) of a qubit located within the Alice's QCD 110 (e.g., the first qubit or Alice's qubit) is teleported to a qubit of Bob's QCD 120 (e.g., the second qubit or Bob's qubit). It is noted that the payload quantum state need not be known to teleport it from Alice's QCD 110 to Bob's QCD 120. It is also noted that, after the teleportation event, both the payload qubit and Alice's qubit are in a pure state, while Bob's qubit is in the payload state, which may include a superposition of the eigenstates of the measurement apparatus of QCS 100).

As noted above, often, but not always, the first qubit (e.g., qubit_A) and the payload qubit are qubits of the QCD 110, while the second qubit (e.g., qubit_B) is a qubit of a second QCD 120. The TaaS 130 is generally responsible for receiving teleportation requests (from classical client device 106) and providing the requested teleportation services. Because the TaaS 130 is federated, it can orchestrate and synchronize the various teleportation operations across multiple QCDs (e.g., first QCD 110 and second QCD 120). In response to (or in anticipation of) receiving a teleportation request from the classical client device 106, the TOS 140 works with the federated qubit registry service 152 to select and allocate qubits for the requested (or anticipated) teleportation event.

More particularly, the TOS 140 may allocate and entangle one or more teleportation qubit pairs. A teleportation qubit pair may include a first qubit (e.g., Alice's qubit or qubit_A) included in the first set of qubits 114 and a second qubit (e.g., Bob's qubit or qubit_B) included in the second set of qubits 124. The allocation and generation of a teleportation qubit pair may be in response to the teleportation request received via the classical client device 106. In other implementations, the generation of a teleportation qubit pair may be in response to an anticipation of a future teleportation event request. In at least one implementation, the TOS 140 may allocate and generate a reserved "pool" of teleportation qubit pairs such that a teleportation qubit pair has been pre-prepared (prior to a specific request) and is ready for employment when a valid teleportation event request is received.

The federated qubit registry service 152 may store and maintain a qubit allocation table. A qubit allocation table may include entries for each qubit of a QCD. The qubit allocation table may indicate which qubits (of a particular QCD) are currently available for allocation for a teleportation event and which qubits are allocated to other quantum processes of the QCD. Because the qubit registry service 152 is federated, the allocation table of the qubit registry service 152 may include entries for each qubit of the first set of qubits 114 and for each qubit of the second set of qubits 124.

The TOS 140, in collaboration with the federated qubit registry service 152, may preemptively (e.g., either before or after an actual (or predicted) teleportation request is actually received) select and allocate an equivalent number of qubits in each first set of qubits 114 and the second set of qubits 124 for the teleportation event. The equivalent number of qubits in the first set of qubits 114 and the second set of qubits 124 may be employed to allocate and generate teleportation qubit pairs.

To maintain a reserved pool of teleportation qubit pairs, either the TOS 140 and/or the qubit registry service 152 may maintain a teleportation qubit pair registry or table. Such a teleportation qubit pair registry or table may include a one-to-one mapping and/or correspondence between the equal number of qubits allocated in each of the first QCD 110 and the second QCD 120. That is, available qubit pairs are preemptively allocated and prepared (e.g., entangled) in a teleportation qubit pair. A first qubit of teleportation qubit pair may be a qubit of the first set of qubits 114 and a second qubit of each teleportation qubit pair may be a qubit of the second set of qubits 124. A map or correspondence of pairings of the allocated qubits may be maintained by the TOS 140 and/or the qubit registry service 152, in the form of a teleportation qubit pair registry or table.

As noted above, the TOS 140 may reserve a pool of allocated (and entangled) teleportation qubit pairs, in anticipation of a request for a teleportation event. In some implementations, the entanglement (e.g., a Bell state) of the qubits of the teleportation qubit pair may occur right after the allocation of the two qubits. Due to the "fragility" (and thus a finite lifetime) of an entangled state, in other implementations, the two qubits may be pre-allocated (before the receipt of the teleportation request) and entangled only after a request has been received. In such implementations, the TOS 140 may register itself as a listener to the TaaS 130. When the TOS 140 detects that the classical client device 106 has requested a teleportation event or the TaaS 130 has invoked a teleportation sequence, the TOS 140 may execute a programmatic entanglement of the first available teleportation qubit pair (e.g., according to entries in the teleportation qubit pair registry or table).

After the teleportation event, the TOS 140 may deallocate the first qubit (e.g., the first qubit of the teleportation qubit pair) may be deallocated. In some implementations, because the payload qubit is in a pure state after the teleportation event, the TOS 140 may deallocate the payload qubit. In other implementations, the payload qubit is not deallocated. The TOS 140 may be customized to minimize or maximize the reserve pool of teleportation qubit pairs, depending on the utilization of the TaaS 130. This allows a balance of not storing and thereby denying the system 100 usage of qubits that are note needed in the short-term for teleportation requests. When a teleportation qubit pair is needed to serve a teleportation request, the TOS 140 may be enabled to allocate and form a teleportation qubit pair quickly. In one implementation, the services of TaaS 130 and/or the TOS 140 may be scaled up or down, depending upon a current bandwidth (e.g., a volume and/or a frequency) of received teleportation requests. Thus, the TOS 140 is enabled to provide teleportation qubit pairs to the TaaS 130 in a "just in time" supply chain and/or inventory.

The TPS 150 may train and implement a teleportation prediction model. Once trained, the teleportation prediction model may predict future teleportation requests. The TPS 150 may provide such predictions to the TOS 140. The TOS 140 may allocate and prepare teleportation qubit pairs based on the predictions of the TPS 150. The TPS 150 may train and implement the teleportation prediction model. The teleportation prediction model may be trained to predict upcoming teleportation requests based on historical usage patterns (e.g., encoded in historical training data). For example, based on the training data, the model may be trained to recognize usage patterns in the users (or clients) of the TaaS 130. The training may occur at the individual user level, a user group level, and/or at the level of the entire population of users. Once sufficiently trained, the model is enabled to predict likely future requests, based on the historical usage patterns. The TPS 150 may provide such predictions to the TOS 140. The TOS 140 may prepare (e.g., selection, allocation, and entanglement of) the qubits for the likely future requests, prior to the user (or client) sending the actual request. In this way, the TOS 140 provides additional efficiency for users of the TaaS 130.

In various implementations, the QCS 100 is enabled to receive a first signal that indicates (or encodes) a request for a quantum teleportation event. The teleportation event may be an event between the first QCD 110 (e.g., which is associated with the first set of qubits 114) and the second QCD 120 (e.g., which is associated with the second set of qubits 124). In various implementations, the request may be received by the TaaS 130 and/or the TOS 140. In some implementations, the request for the teleportation event originated at the classical client device 106. In other implementations, the teleportation event is a predicted teleportation event. The predicted teleportation event may have been predicted by the TPS 150. More particularly, the TPS 150 may employ the trained teleportation prediction model to predict the teleportation event. The teleportation event may be predicted based on a pattern of previous requests for previous quantum teleportation operations. The previous requests for previous quantum teleportation operations may be encoded in training data. The training data may be employed to train the teleportation prediction mode. In such implementations, the request is a predicted request for the predicted teleportation event.

An actual or a predicted request for the teleportation event may indicate (or encode) a selection of the first QCD 110 from a set a set of possible QCDs (or a set of possible QCSs), a selection of the second QCD 120 from the set of the QCDs (or the set of possible QCSs), and a selection of a payload qubit from the first set of qubits 114. In other implementations, in response to receiving the first signal, the TOS 140 may cause a selection of the first QCD 110 from the set of possible QCDs. The selection of the first QCD 110 may be based on a qubit allocation table (e.g., of the qubit registry service 152). The qubit allocation table may indicate that a subset of the first set of qubits 114 is currently unallocated. Also, in response to receiving the first signal, the TOS 140 may cause a selection of the second QCD 120 from the set of possible QCDs. The selection of the second QCD 120 may be based on the qubit allocation table indicating that a subset of the second set of qubits 124 is currently unallocated In response to receiving the first signal, the TOS 140 (in consultation with the qubit registry service 152), may cause a selection of a first qubit from the first set of qubits 114. The selection of the first qubit may be based on a qubit allocation table of the qubit registry service 152. The qubit allocation table may indicate that the first qubit of the first set of qubits 114 is currently unallocated. Likewise, in response to receiving the first signal, the TOS 140 may cause a selection of a second qubit from the second set of qubits 124. The selection of the second qubit may be based on the qubit allocation table. The qubit allocation table may indicate that the second qubit is currently unallocated.

In response to selecting the first qubit, the TOS 140 may cause an allocation of the first qubit of the first set of qubits 114 for the teleportation event. In response to selecting the second qubit of the second set of qubits 124, the TOS 140 may cause an allocation of the second qubit of the second set of qubits 124 for the teleportation event. The first and second allocated qubits may form a teleportation qubit pair.

An entry in the teleportation qubit pair registry and/or the qubit allocation table may be made to indicate the allocation of the teleportation qubit pair. For instance, in response to the allocation of the first qubit and the second qubit for the teleportation event, the TOS 140 and/or the qubit registry service 152 may cause a generation of a first record and a second record in at least one qubit registry. The qubit registry may be the teleportation qubit pair registry and/or the qubit allocation table. The first record may encode a first indication of the allocation of the first qubit for the teleportation event. The second record may encode a second indication of the allocation of the second qubit for the teleportation event.

The TOS 140 may cause and/or initiate a quantum entanglement of the first and second allocated qubits. In various implementations, the quantum entanglement may be caused automatically after the allocation of the first and second qubits. In other implementations, the entanglement may be initiated in response to receiving an additional signal. In some implementations, the additional signal may indicate that the TaaS 130 has initiated the requested teleportation event. In other implementations, the additional signal may indicate that the TaaS 130 has received a request for the teleportation event. The entanglement of two qubits may include the TOS 140 causing a preparation of the first and second qubits, such that the two qubits are in a Bell state (e.g., $|\psi^+\rangle = 1/\sqrt{2}(|00\rangle + |11\rangle)$, or $|\psi^-\rangle = 1/\sqrt{2}(|00\rangle - |11\rangle)$).

In some implementations, in response to receiving the first signal, the TOS 140 may cause an allocation of a payload qubit for the teleportation event. The payload qubit may be a qubit of the first set of qubits 114. In at least one implementation, the first signal encodes an indication of the payload qubit. In other implementations, the payload qubit may already be allocated to an ongoing quantum computation process implemented by the QCS 100. In at least one implementation, the TOS 140 may cause a preparation of the payload qubit. After the preparation of the payload qubit, a quantum state of the payload qubit is in a payload quantum state. The payload quantum state is to be teleported to the second qubit of the teleportation qubit pair.

In some implementations, the TOS 140 and/or the TaaS 130 may cause an entanglement (e.g., a Bell state) of the first qubit of the teleportation qubit pair and the payload qubit. After the entanglement of the first qubit and the payload qubit, the TOS 140 and/or the TaaS 130 may cause a first measurement (via a measurement apparatus of the first QCD 110) of the first qubit of the teleportation qubit pair. Due to the collapse of the wave function when the first qubit is measured, the first measurement may yield a first "pure" state for the first qubit (e.g., $|\psi\rangle = |0\rangle$ or $|\psi\rangle = |0\rangle$). The TOS 140 and/or the TaaS 130 may cause a second measurement of the payload qubit. Similarly, when the second qubit is measured, the second measurement may yield a second pure state for the payload qubit.

Based on the measurements, the TOS 140 and/or the TaaS 130 may cause a generation of a data structure. The data structure may encode the first measurement on the first qubit and the second measurement on the payload qubit. Thus, the data structure may encode one of four possibilities: $|\psi\rangle = |00\rangle$, $|\psi\rangle = |01\rangle$, $|\psi\rangle = |10\rangle$, or $|\psi\rangle = |11\rangle$. The TOS 140 and/or the TaaS 130 may cause a transmission of the data structure from the first QCD 110 to the second QCD 120. In at least one non-limiting implementation, the data structure may be transmitted to the TOS 140 and/or the TaaS 130. After receiving the data structure, the TOS 140 and/or the TaaS 130 may cause a sequence of quantum operations on the second qubit of the teleportation qubit pair. The sequence of quantum operations may be based on the first measurement on the first qubit and the second measurement on the payload qubit that are encoded in the transmitted data structure. After the sequence of quantum operations are performed on the second qubit of the teleportation qubit pair, the quantum state of the second qubit may be equivalent to the payload quantum state of the payload qubit, prior to the measurement of the payload qubit.

Figure 1B:
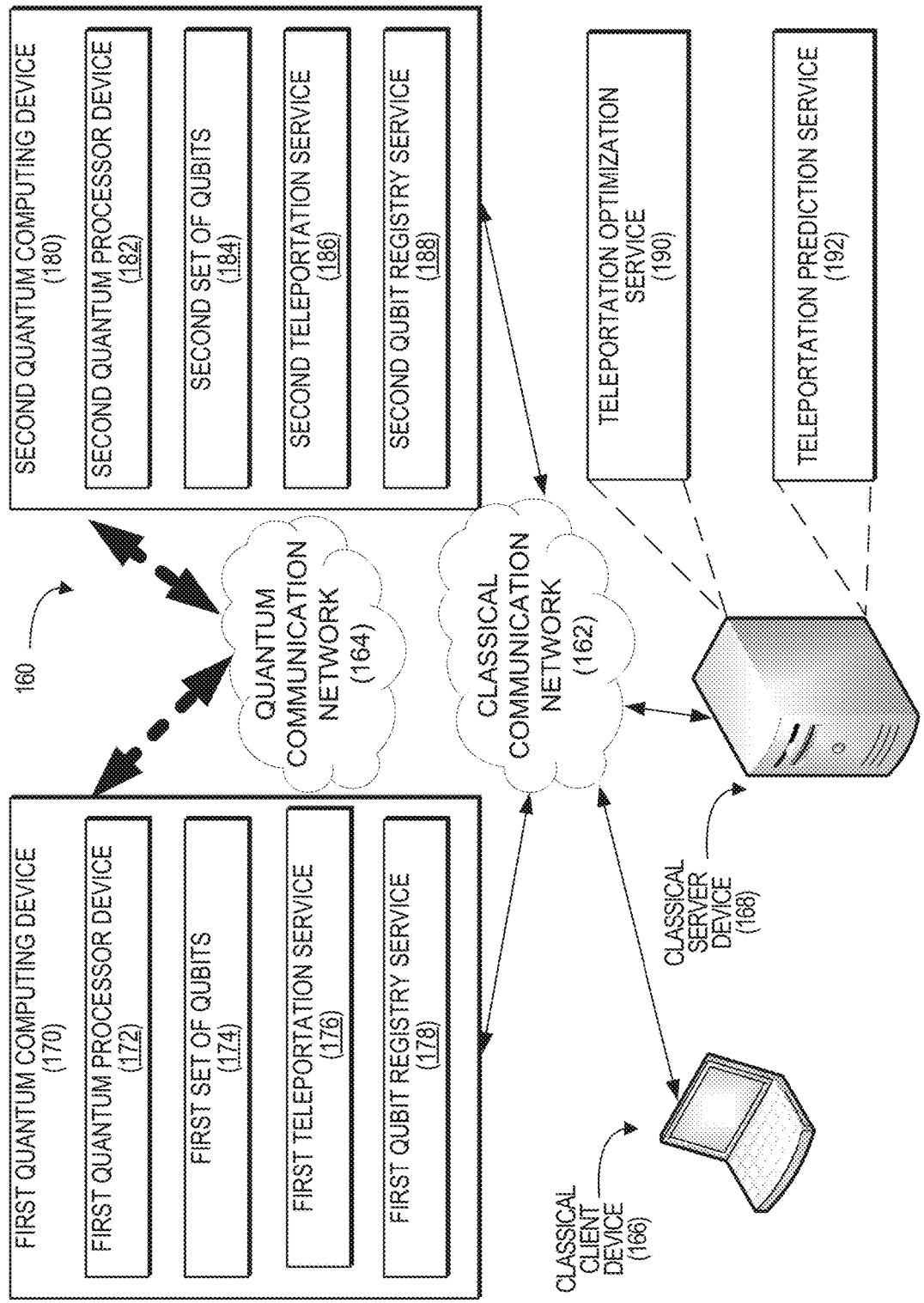
FIG. 1B is a block diagram of another computing system in which optimizing quantum teleportation as a service may be practiced.

The TOS 140 may receive another (e.g., a second) signal. The second signal may indicate a successful completion of the teleportation event. In response to receiving the second signal the TOS 140 may cause a deallocation of the first qubit of the first set of qubits 114. In response to receiving the second signal, the TOS 140 may cause a deallocation of the payload qubit of the first set of qubits FIG. 1B is a block diagram of another computing system 160 in which examples may be practiced. Computing system 160 of FIG. 1B may be similar to computing system 100 of FIG. 1A. Thus, computing system 100, computing system 160 may be a quantum computing system (QCS). Both system 100 and system 160 may implement any of the implementations discussed herein. As such, computing system 160 includes a first quantum computing device (QCD) 170 and second QCD 180. First QCD 170 may be similar to first QCD 110 of FIG. 1A and second QCD 1800 may be similar to second QCD 120 of FIG. 1A. As such, first QCD 170 may include a first quantum processor device 172 (which may be similar to first quantum processor device 112 of first QCD 110) and a first set of qubits 174 (which may be similar to first set of qubits 114 of first QCD 110). Second QCD 180 may include a second quantum processor device 182 (which may be similar to second quantum processor device 122 of second QCD 120) and a second set of qubits 184 (which may be similar to second set of qubits 124 of second QCD 120).

Computing system 160 may additionally include a classical communication network 162 and a quantum communication network 164. Classical communication network 162 may be similar to classical communication network 102 of system 100 and quantum communication network 164 may be similar to quantum communication network 104 of system 100. System 160 may also include a classical client device 166, which may be similar to classical client device 106 of system 100. System 160 may additionally include a classical server device 168. Classical server device 168 may implement a teleportation optimization service (TOS) 190 and a teleportation prediction service (TPS) 192. TOS 190 may be similar to TOS 140 of system 100 and TPS 192 may be similar to TPS 150 of system 100. Although not shown explicitly in FIG. 1A, the TOS 140, the TPS 150, and the federated qubit registry service 152 of system 100 may be implemented by a classical computing server device, including but not limited to classical server device 168.

One structural difference between system 100 and system 160, is that rather than having a federated teleportation service (e.g., federated TaaS 130) and a federated qubit registry service (e.g., federated qubit registry service 152), each QCD may include its own teleportation service and its own qubit registry service. As shown in FIG. 1B, first QCD 170 includes a first teleportation service 176 and a first qubit registry service 178. As also shown in FIG. 1B, second QCD 180 includes a second teleportation service 186 and a second qubit registry service 188.

The combination of the first teleportation service 176 and the second teleportation service 186 may work together to provide similar services as federated TaaS 130 of system 100. Likewise, the combination of the first qubit registry service 178 and the second registry service 188 may work together to provide similar services as federated qubit registry service 152 of system 100. For example, the TOS 190 may consult each of the first qubit registry service 178 and the second qubit registry service 188 when selecting and allocating qubits for the formation of a teleportation qubit pair.

Figure 2A:
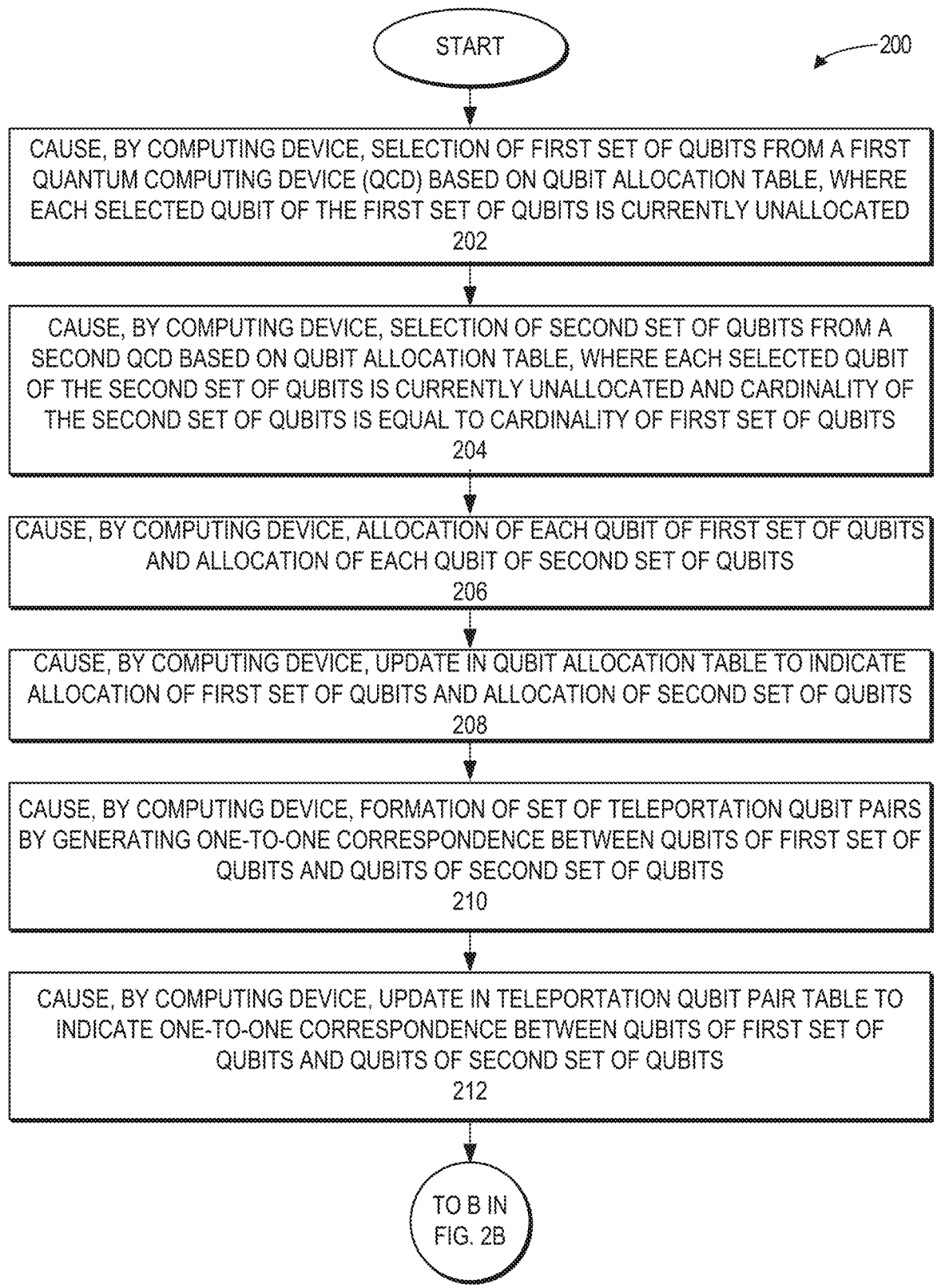
FIGS. 2A-5 are flowcharts illustrating operations performed by the computing systems of FIGS. 1A-1B for providing optimized teleportation services.

FIGS. 2A-5 are flowcharts illustrating operations performed by the computing systems of FIGS. 1A-1B for providing optimized teleportation services. The flowcharts of FIGS. 2A-2D show methods for providing optimized teleportation services. More particularly, FIG. 2A shows a method 200 and FIG. 2B shows method 220, which is a continuation of method 200. FIG. 2C shows a method 240, which is a continuation of method 220. FIG. 2D shows a method 260, which is a continuation of method 240. Turning attention to FIG. 2A, method 200 begins at block 202, where a computing device causes a selection of a first set of qubits from a first quantum computing device (QCD). The selection of the first set of qubits may be based on a qubit allocation table. According to the qubit allocation table, each selected qubit of the first set of qubits may be currently unallocated. At block 204, the computing device may cause a selection of a second set of qubits from a second QCD. The selection set of qubits may be based on the qubit allocation table. According to the qubit allocation table, each selected qubit of the second set of qubits may be currently unallocated.

At block 206, the computing device may cause an allocation of each qubit of the first set of qubits. Also at block 206, the computing device may cause an allocation of each qubit of the second set of qubits. At block 208, the computing device may cause an update in the qubit allocation table. The update in the qubit allocation table may indicate the allocation of the first set of qubits and the allocation of the second set of qubits. At block 210, the computing device may cause a formation of a set of teleportation qubit pairs. In forming the set of teleportation qubit pairs, a one-to-one correspondence between the qubits of the first set of qubits and the qubits of the second set of qubits may be generated. At block 212, the computing device may cause an update in the teleportation qubit pair table. The update to the teleportation qubit table may indicate the one-to-one correspondence between the qubits of the first set of qubits and the qubits of the second set of qubits. Method 200 may proceed to block B of method 220 of FIG. 2B.

Figure 2B:
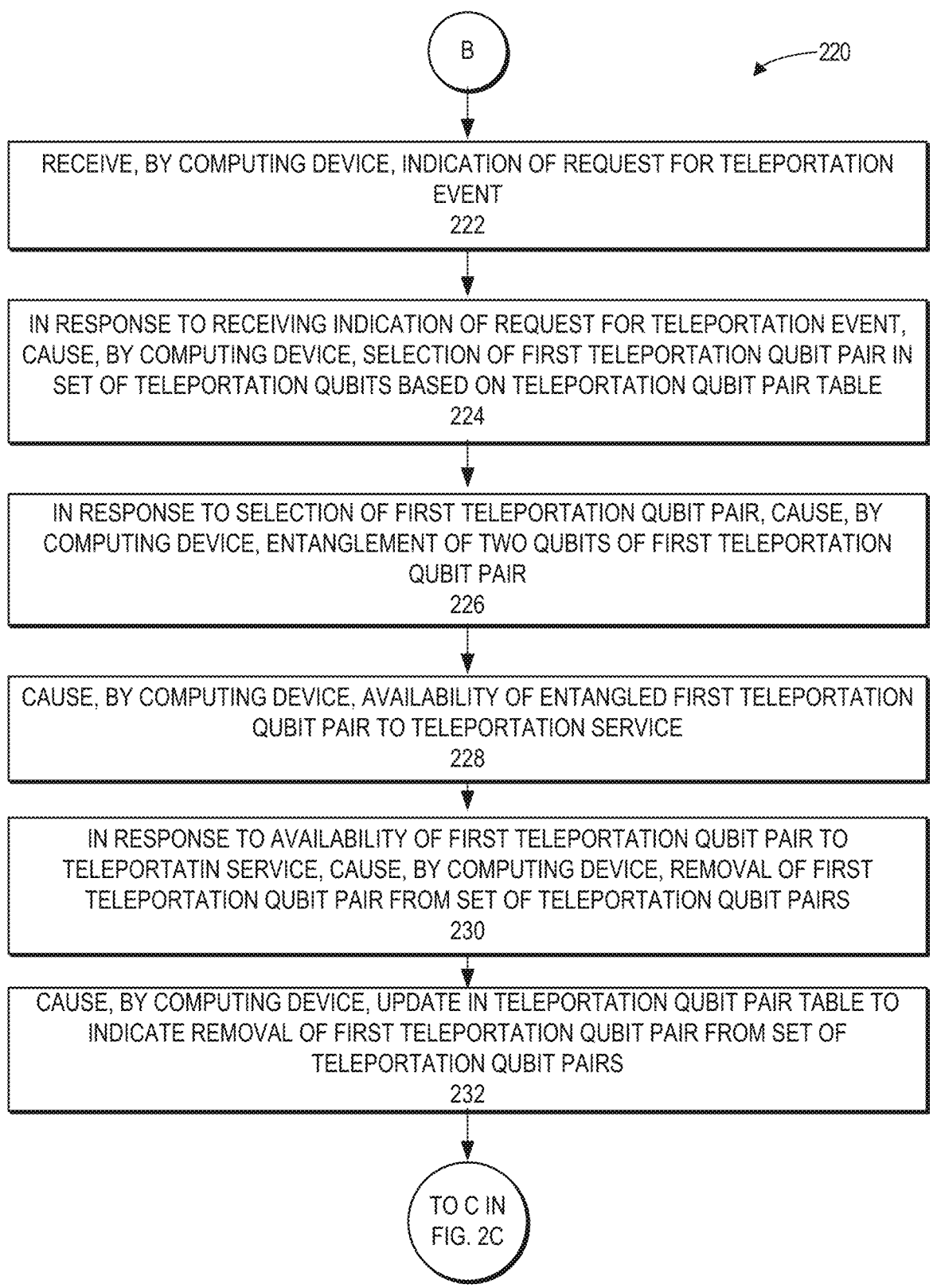

Method 220 of FIG. 2B may begin at block 222, where the computing device may receive an indication of a request for a teleportation event. At block 224, and in response to receiving the indication of the request for the teleportation event, the computing device may cause a selection of a first teleportation qubit pair from the set of teleportation qubit pairs. The selection of the first teleportation qubit pair may be based on the teleportation qubit pair table. At block 226, and in response to the section of the first teleportation qubit pair, the computing device may cause an entanglement of the two qubits of the first teleportation qubit pair. At block 228, the computing device may cause an availability of the entangled first teleportation qubit pair to a teleportation service. At block 230, and in response to the availability of the entangled first teleportation qubit pair to a teleportation service, the computing device may cause a removal of the first teleportation qubit pair from the set of teleportation qubit pairs. At block 232, the computing device may cause an update in the teleportation qubit pairs table. The update to the teleportation qubit pairs table may indicate the removal of the first teleportation qubit pair from the set of teleportation qubit pairs. Method 220 may proceed to block C of method 240 of FIG. 2C.

Figure 2C:
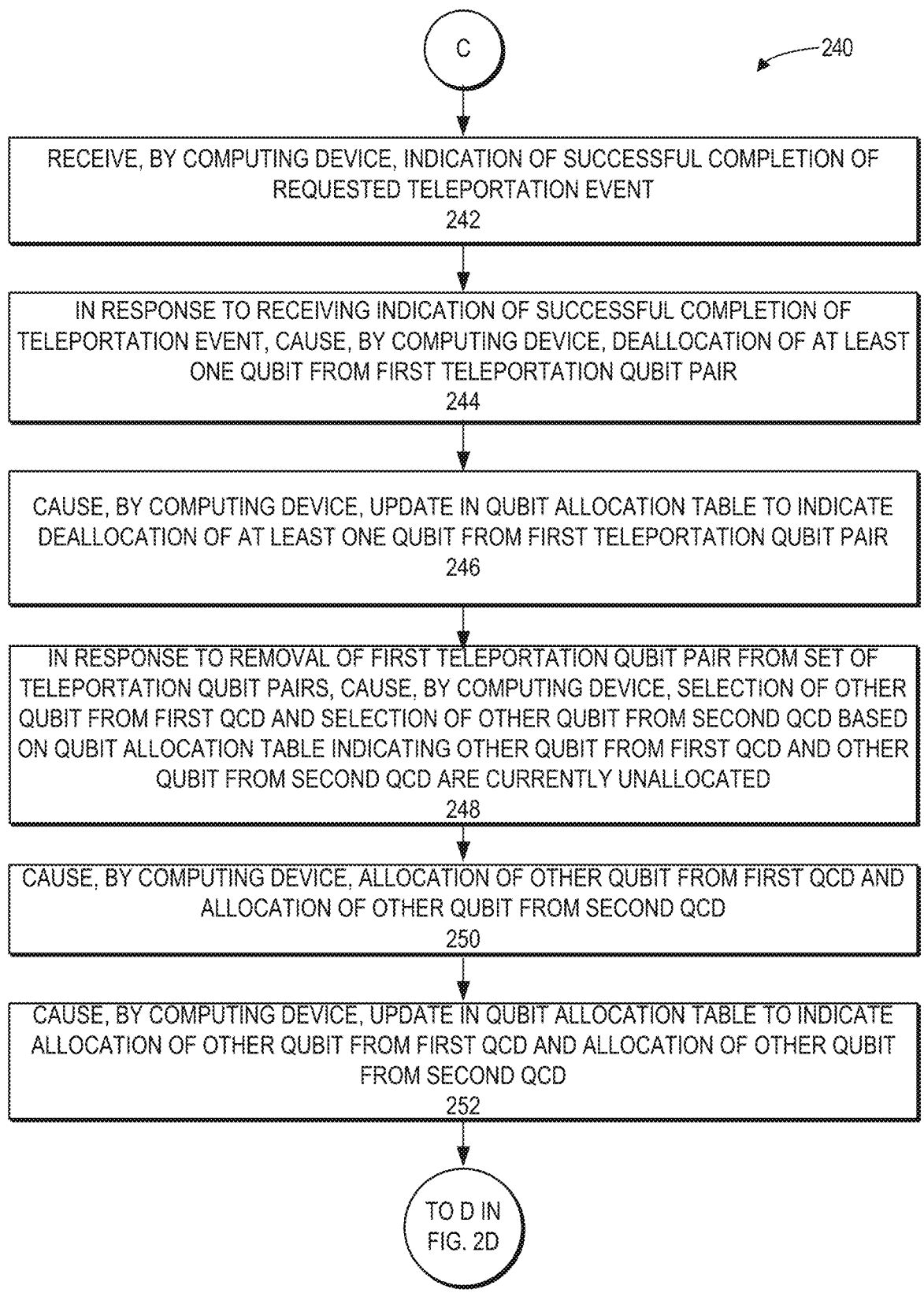

Method 240 of FIG. 2C may begin at block 242, where the computing device receives an indication of a successful completion of the requested teleportation event. At block 244, and in response to receiving the indication of the successful completion of the teleportation event, the computing device may cause a deallocation of at least one qubit from the first teleportation qubit pair. At block 246, the computing device may cause an update to the qubit allocation table. The update to the qubit allocation table may indicate the deallocation of the at least one qubit from the first teleportation qubit pair. At block 248, and in response to the removal of the first teleportation qubit pair from the set of teleportation qubit pairs, the computing device may cause a selection of at least another qubit from the first QCD and a selection of another qubit from the second QCD. The selection of the other qubits may be based on the qubit allocation table indicating that the other qubits from the first QCD and the second QCD are currently unallocated. At block 250, the computing device may cause an allocation of the other qubit from the first QCD and an allocation of the from the second QCD. At block 252, the computing device may cause an update to the qubit allocation table. The update to the qubit allocation table may indicate the allocation of the other qubit from the first QCD and the allocation of the other cubic from the second QCD. Method 240 may proceed to block D of method 260 of FIG. 2D.

Figure 2D:
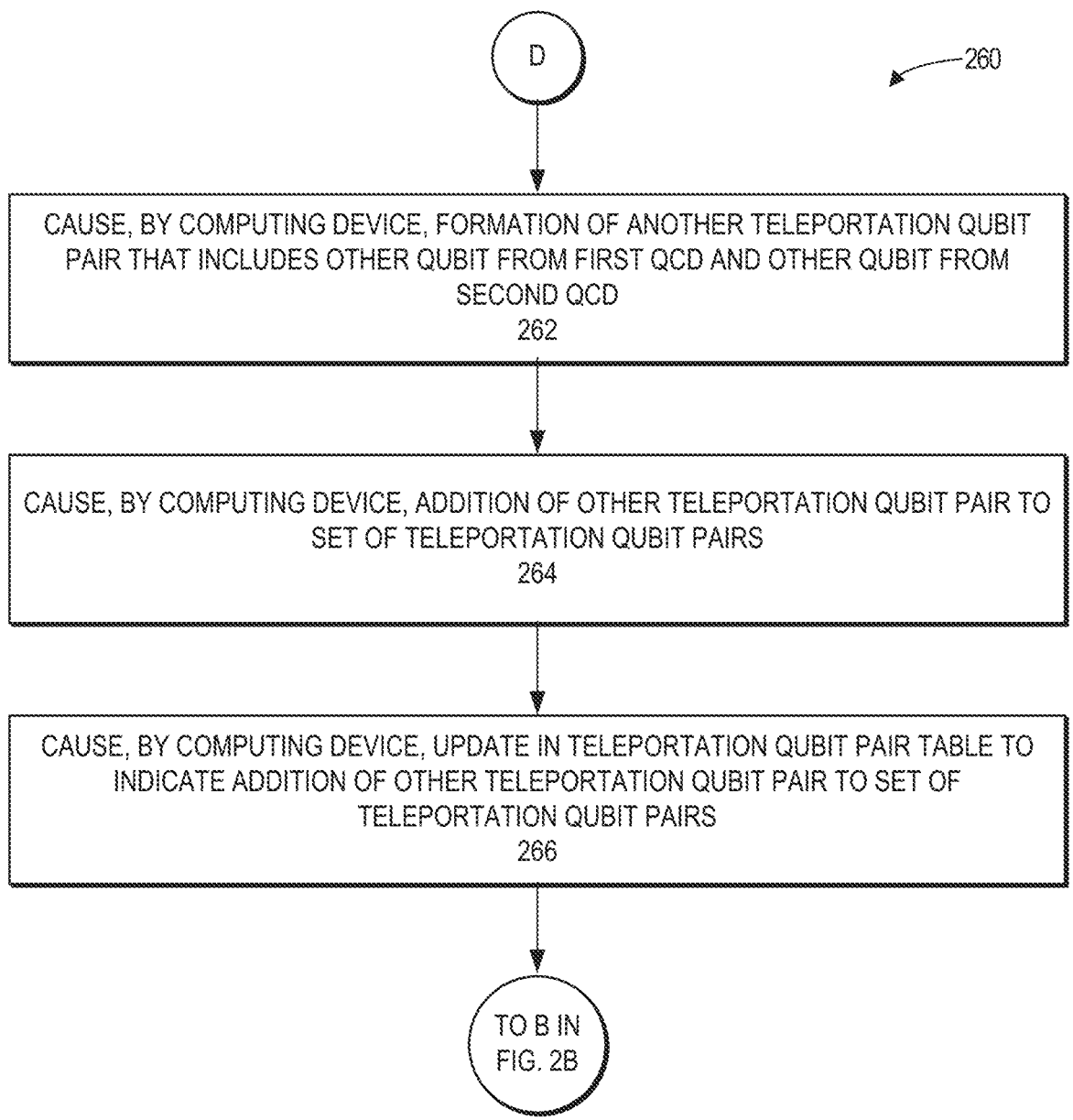

Method 260 of FIG. 2D may begin at block 262, where the computing device may cause a formation of another teleportation qubit pair. The other teleportation qubit pair may include the other qubit from the first QCD and the other qubit from the second QCD. At block 264, the computing device may cause an addition of the other teleportation qubit pair to the set of teleportation qubit pairs. At block 266, the computing device may cause an update in the teleportation qubit pair table. The update in the teleportation qubit pair table may indicate the addition of the other teleportation qubit pair to the set of teleportation cubic pairs. Method 260 may return to block B of method 220 of FIG. 2B.

Figure 3A:
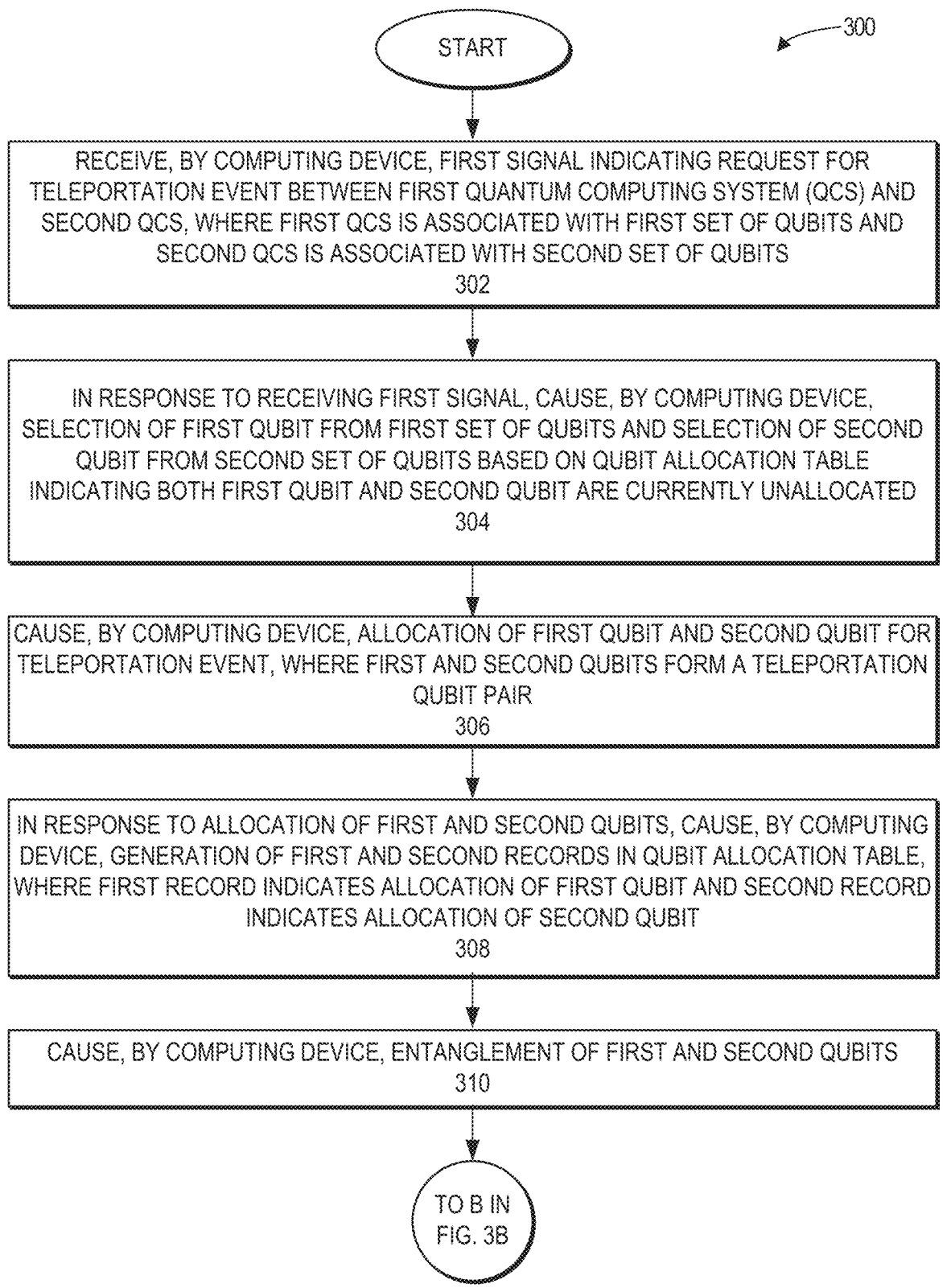
Figure 3B:
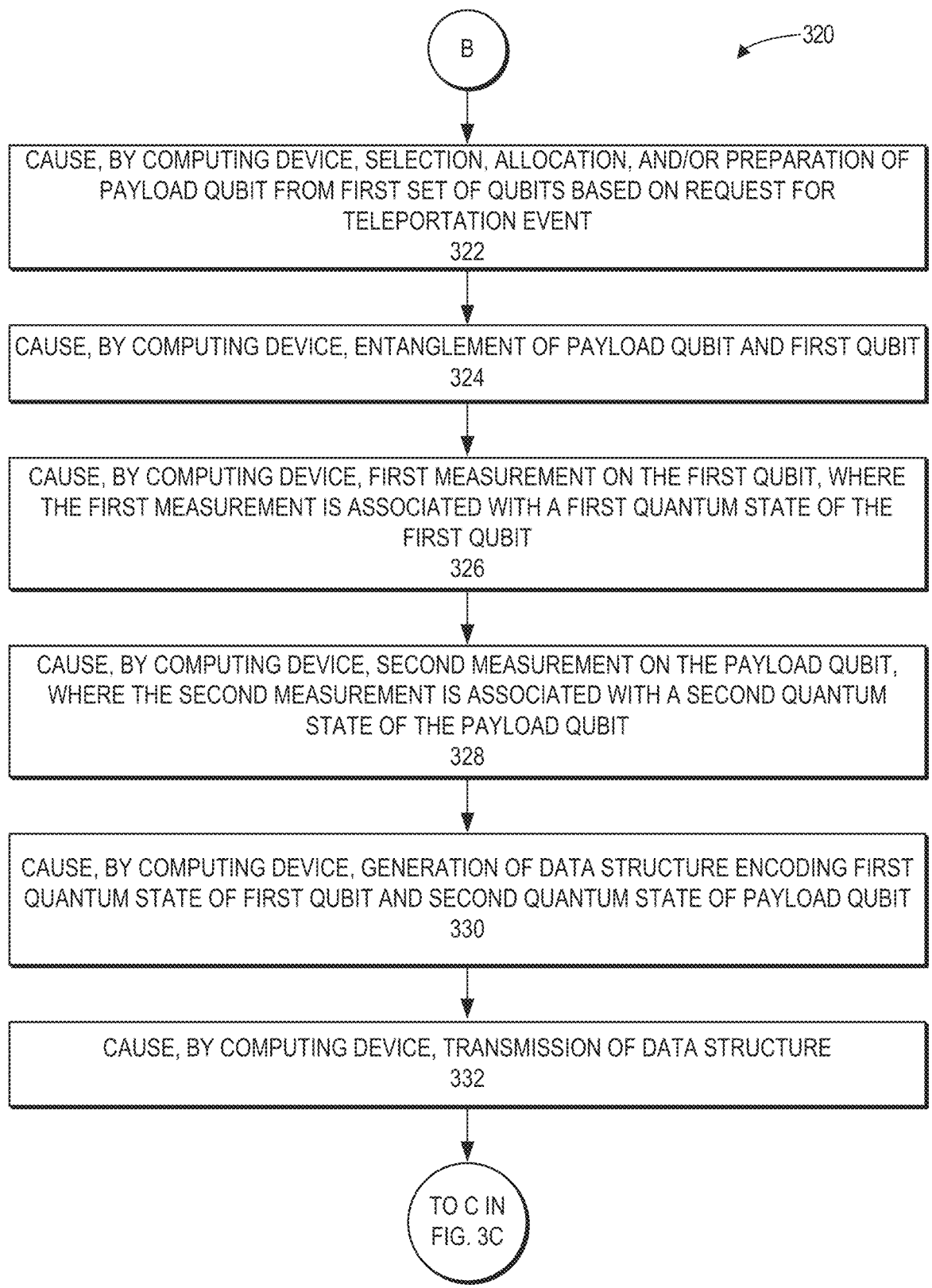
Figure 3C:
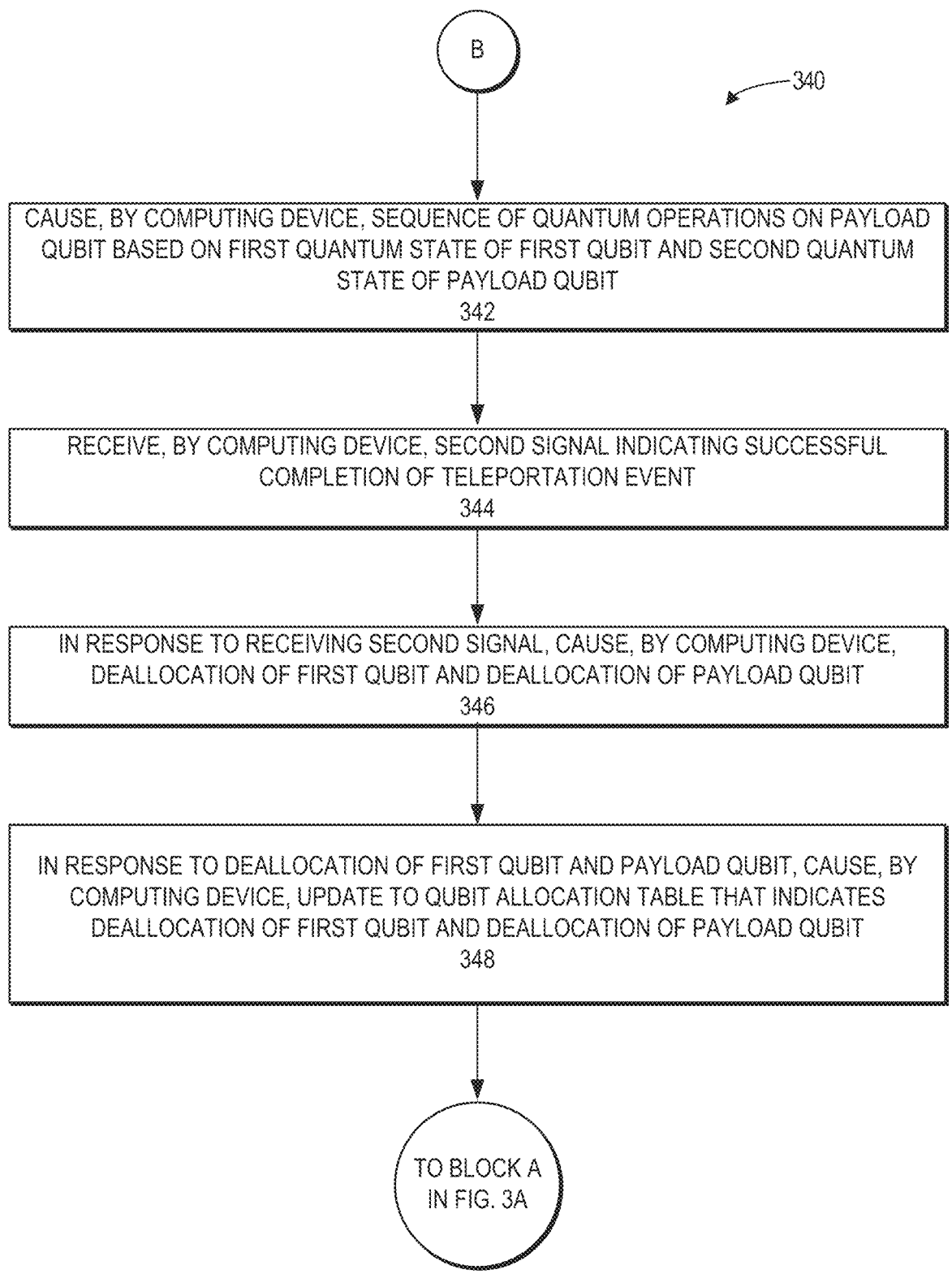

The flowcharts of FIGS. 3A-3C show other methods for providing optimized teleportation services. More particularly, FIG. 3A shows a method 300 and FIG. 3B shows method 320, which is a continuation of method 300. FIG. 3C shows a method 340, which is a continuation of method 320. Turning attention to FIG. 3A, method 300 begins at block 302, where a computing device receives a first signal. The first signal may indicate a request for a teleportation event. The teleportation event may be between a first quantum computing system (QCS) and a second QCS. The first QCS may be associated with the first set of qubits and the second QCS may be associated with the second set of qubits. At block 304, and in response to receiving the first signal, the computing device may cause a selection of a first a bit from the first set of qubits. At block 304, the computing device may also cause a selection of a second qubit from the second set of qubits. The selection of the first qubit and the selection of the second qubit maybe based on a qubit allocation table. The qubit allocation table may indicate that both the first qubit and the second qubit are currently unallocated.

At block 306, the computing device may cause an allocation of the first qubit and the second qubit for the teleportation event. The first and second qubits may form a teleportation qubit pair. At block 308, and in response to the allocation of the first and second qubits, the computing device may cause a generation of a first record and a second record in the qubit allocation table. The first record may indicate the allocation of the first qubit and the second record might indicate the allocation of the second qubit. At block 310, the computing device may cause an entanglement of the first and second qubits. Method 300 may proceed to block B of method 320 of FIG. 3B.

Method 320 of FIG. 3B may begin at block 322, where the computing device may cause a selection, allocation, and/or preparation of a payload. The payload qubit maybe from the first set of qubits. The selection, allocation, and/or preparation of the payload qubit may be based on the request for the teleportation event. At block 324, the computing device may cause an entanglement of the payload qubit and the first qubit. At block 326, the computing device may cause a first measurement of the first qubit. The first measurement of the first qubit may be associated with a first quantum state of the first qubit. At block 328, the computing device may cause a second measurement on the payload qubit. The second measurement on the payload qubit may be associated with a second quantum state of the payload qubit. At blocker 330, the computing device may cause a generation of a data structure. The data structure may encode the measurement first quantum state of the first qubit and the measurement of the second quantum state of the payload qubit. At block 332, the computing device may cause the transmission of the data structure. Method 320 may proceed to block C of method 340 of FIG. 3C.

Method 340 of FIG. 3C may begin at block 342, where the computing device may cause a sequence of quantum operations on the payload qubit. The sequence of operations may be based on the first quantum state of the first qubit and the second quantum state of the payload qubit that are encoded in the transmitted data structure purpose. At block 344, the computing device may receive a second signal indicating a successful completion of teleportation event. At block 346, response to receiving a second signal, the computing device may cause and deallocation of the first qubit and a deallocation of the payload qubit pier at block 348, and in response to the deallocation of the first qubit and the payload qubit, the computing device may cause an update to the qubit allocation table. The update to the queue that allocation table meant indicate the deallocation of the first qubit and the deallocation to the second qubit. Method 340 may proceed to block A of method 300 of FIG. 3A.

Figure 4:
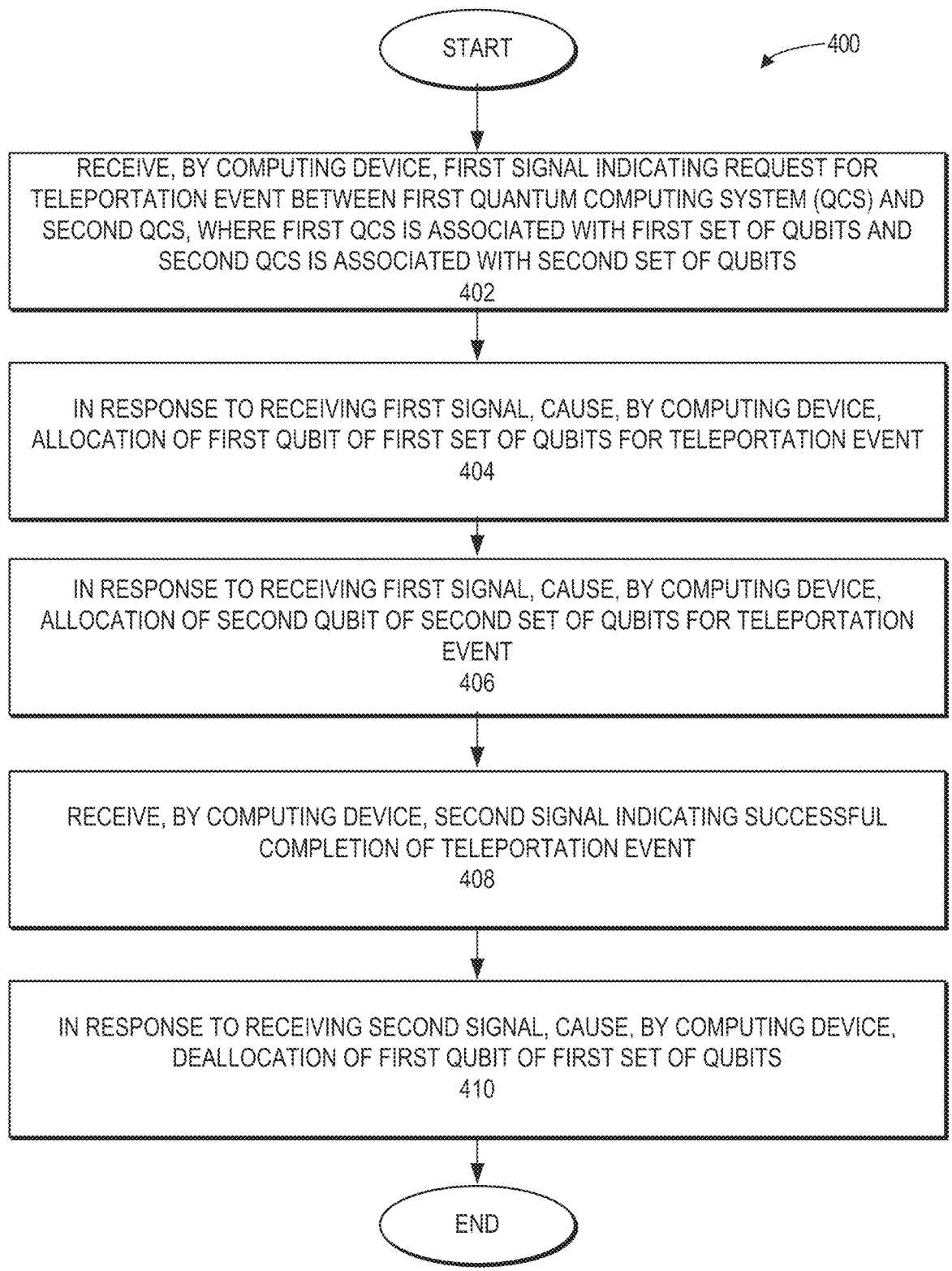

The flowchart of FIG. 4 shows another method 400 for providing optimized teleportation services. Method 400 begins, at block 402, where a computing device receives a first signal. The first signal may indicate a request for a teleportation event between a first quantum computing system (QCS) and a second QCS. The first QCS may be associated with the first set of qubits. The second QCS may be associated with the second set of qubits. At block 404, in response to receiving the first signal, the computing device may cause an allocation of the first qubit of the first set of qubits for the teleportation event. At block 406, in response to receiving the first signal, the computing device may cause an allocation of the second qubit of the second side qubits for the teleportation event. At block 408, the computing device may receive a second signal. The second signal may indicate a successful completion of the teleportation event. At block 410, in response to receiving the second signal, the computing device may cause a deallocation of the first qubit of this first set of qubits.

Figure 5:
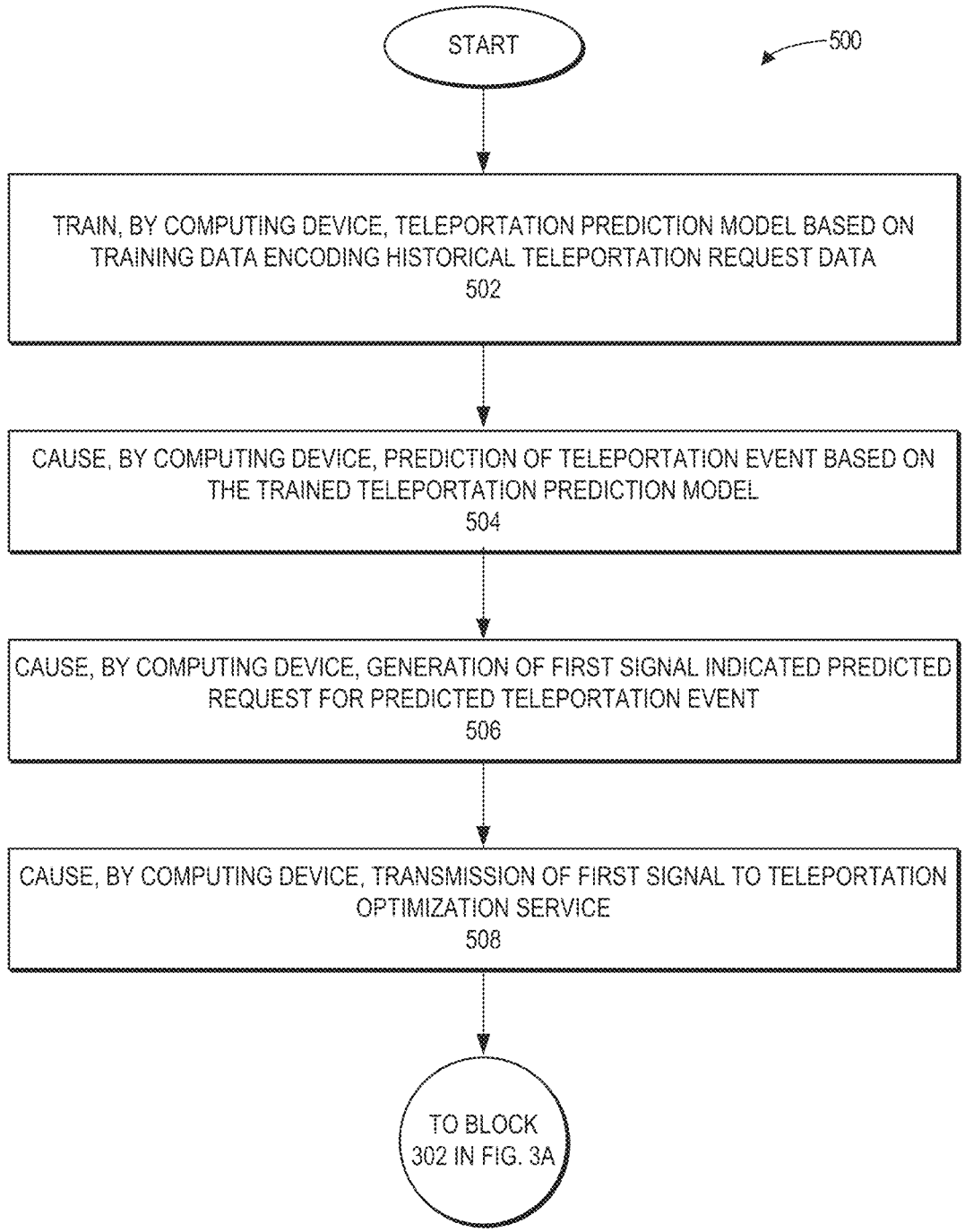

The flowchart of FIG. 5 shows a method 500 for predicting teleportation request. Method 500 begins, at block 502, where a computing device may train a teleportation prediction model. The training of the teleportation prediction model may be based on training data. The training data may encode historical teleportation request data. At block 504, the computing device may cause a prediction of a teleportation event based on the trained teleportation prediction model. At block 506, the computing device may cause a generation of a first signal. The first signal may indicate a predicted request for the predicted teleportation event. At block 508, the computing device may cause a transmission of the first signal to a teleportation optimization service.

Another implementation includes a method for providing teleportation services. The method may include receiving, by a computing device, a first signal. The first signal may indicate a request for a teleportation event between a first quantum computing system (QCS) and a second QCS. A first set of qubits may be associated with the first QCS. A second set of qubits may be associated with the second QCS. In response to receiving the first signal, the computing device may cause an allocation of a first qubit of the first set of qubits for the teleportation event. In response to receiving the first signal, the computing device may cause an allocation of a second qubit of the second set of qubits for the teleportation event. The computing device may receive a second signal that indicates a successful completion of the teleportation event. In response to receiving the second signal, the computing system may cause a deallocation of the first qubit of the first set of qubits.

In at least one implementation, the method further includes in response to receiving a third signal that indicates a request to initiate the teleportation event, causing, by the computing device, a quantum entanglement of the first qubit and the second qubit. Causing the quantum entanglement of the first qubit and the second qubit may include causing, by the computing device, a preparation of an entangled qubit system that includes the first qubit and the second qubit. A quantum state of the entangled qubit system may be in a Bell state.

The method may further include, in response to receiving the first signal, causing, by the computing device, an allocation of a payload qubit of the first set of qubits for the teleportation event. The computing device may cause, at the first QCS, a preparation of the payload qubit. A quantum state of the prepared payload qubit may be in a payload quantum state. The payload quantum state may be teleported to the second qubit associated with the second set of qubits. In response to receiving the second signal, the computing device may cause a deallocation of the payload qubit of the first set of qubits. At the first QCS, the computing device may cause a quantum entanglement of the first qubit and the payload qubit.

The method may further include at the first QCS, the computing device causing a first measurement on the first qubit. The first measurement may result in a first pure quantum state being associated with the first qubit. The computing device may cause, at the first QCS, a second measurement on the payload qubit. The second measurement may result in a second pure quantum state being associated with the payload qubit. The computing device may cause, at the first QCS, a generation of a data structure. The data structure may encode the first pure quantum state of the first measurement on the first qubit and the second pure quantum state of the second measurement on the payload qubit. The computing device may cause a transmission of the data structure from the first QCS to the second QCS. The method may further include the computing device causing, at the second QCS, a sequence of quantum operations on the second qubit. A quantum state of the second qubit may be the teleported payload quantum state. The sequence of quantum operations may be based on the first measurement on the first qubit and the second measurement on the payload qubit that are encoded in the transmitted data structure. In some implementations, the request for the teleportation event may have originated at a client device. The client device may be a classical client device that is a client of a teleportation service.

In other implementations, the teleportation event may be a predicted teleportation event. The predicted teleportation even may have been predicted based on a pattern of previous requests for previous quantum teleportation operations. In such implementations, the request may be a predicted request for the predicted teleportation event. A teleportation prediction model may be trained. The training of the prediction model may be based on training data. The training data may encode the previous requests for previous quantum teleportation operations. The method may further include implementing the trained teleportation prediction model to predict the predicted teleportation event. A teleportation prediction service (TPS) may train and implement the teleportation prediction model. The teleportation prediction service may cause a transmission of the first signal from the teleportation prediction service to the computing device and/or a teleportation optimization service (TOS).

The method may include, in response to the allocation of the first qubit and the second qubit for the teleportation event, the computing device causing a generation of a first record and a second record in at least one qubit registry. The first record may encode a first indication that indicates the allocation of the first qubit for the teleportation event. The second record may encode a second indication that indicates the allocation of the second qubit for the teleportation event. In response to the deallocation of the first qubit for the teleportation event, the computing device may cause a generation of a third record in the at least one qubit registry. The third record may encode a third indication of the deallocation of the first qubit. In at least one implementation, in response to the deallocation of the payload qubit for the teleportation event, the computing device may cause a generation of a fourth record in the at least one qubit registry. The fourth record may encode a fourth indication that indicates the deallocation of the payload qubit. In at least one implementation, the computing device may cause a deallocation of the second qubit. In such implementations, in response to the deallocation of the second qubit for the teleportation event, the computing device may cause a generation of a fifth record in the at least one qubit registry. The fifth record may encode a fifth indication that indicates the deallocation of the second qubit.

In some implementations, the method includes in response to receiving the first signal, the computing device causing a selection of the first qubit from the first set of qubits. The selection of the first qubit may be based on at least one qubit allocation table of at least one qubit registry. The at least one qubit allocation table may indicate that the first qubit is currently unallocated. In response to the selection of the first qubit, the computing device may cause the allocation of the currently unallocated first qubit of the first set of qubits for the teleportation event. In response to receiving the first signal, the computing device may cause a selection of the second qubit from the second set of qubits. The selection of the second qubit may be based on the at least one qubit allocation table of the at least one qubit registry. The at least one qubit allocation table may indicate that the second qubit is currently unallocated. In response to the selection of the second qubit, the computing device may cause the allocation of the currently unallocated second qubit of the second set of qubits for the teleportation event.

The at least one qubit registry may include a first qubit registry associated with the first QCS and a second qubit registry associated with the second QCS. The at least one qubit allocation table may include a first qubit allocation table of the first qubit registry and a second qubit allocation table of the second qubit registry. The computing device may cause a generation of a first record in the first qubit allocation table. The first record in the first qubit allocation table may indicates the allocation of the first qubit for the teleportation event. The computing device may cause a generation of a second record in the second qubit allocation table. The second record in the second qubit allocation table may indicate the allocation of the second qubit for the teleportation event.

In another implementation, the computing device may cause an update to the at least one allocation table. The at least one allocation table may include a teleportation qubit pair registry and/or table. The update to the at least one allocation table may indicate the allocation of the first qubit for the teleportation event and the allocation of the second qubit for the teleportation event. The update may also indicate a first address associated with the first qubit, a second address associated with the second qubit, and a one-to-one map between the first address associated with the first qubit and the second address of the second qubit. The first and second qubits may form a teleportation qubit pair.

In response to receiving the first signal, the method may include the computing device causing a selection of the payload qubit from the first set of qubits. The selection of the payload qubit may be based on at least one qubit allocation table of at least one qubit registry. The at least one qubit allocation table may indicate that the payload qubit is currently unallocated. In response to the selection of the payload qubit, the computing device may cause an allocation of the currently unallocated payload qubit of the first set of qubits for the teleportation event. In response to the allocation of the payload qubit, the computing device may cause a preparation of the payload qubit. A quantum state of the prepared payload qubit may be in a payload quantum state. The payload quantum state may be in a superposition of two eigenstates. The payload quantum state is to be teleported to the second qubit associated with the second set of qubits.

In some implementations, the request for the teleportation event may indicates a selection of the first QCS from a set of QCS, a selection of the second QCS from the set of the QCS, and a selection of a payload qubit from the first set of qubits. In other implementations and in response to receiving the first signal, the computing device may cause a selection of the first QCS from a set of QCSs. The selection of the first QCS may be based on at least one qubit allocation table indicating that a subset of the first set of qubits is currently unallocated. In response to receiving the first signal, the computing device may cause a selection of the second QCS from the set of QCSs. The selection of the second QCS may be based on the at least one qubit allocation table indicating that a subset of the second set of qubits is currently unallocated.

Figure 6:
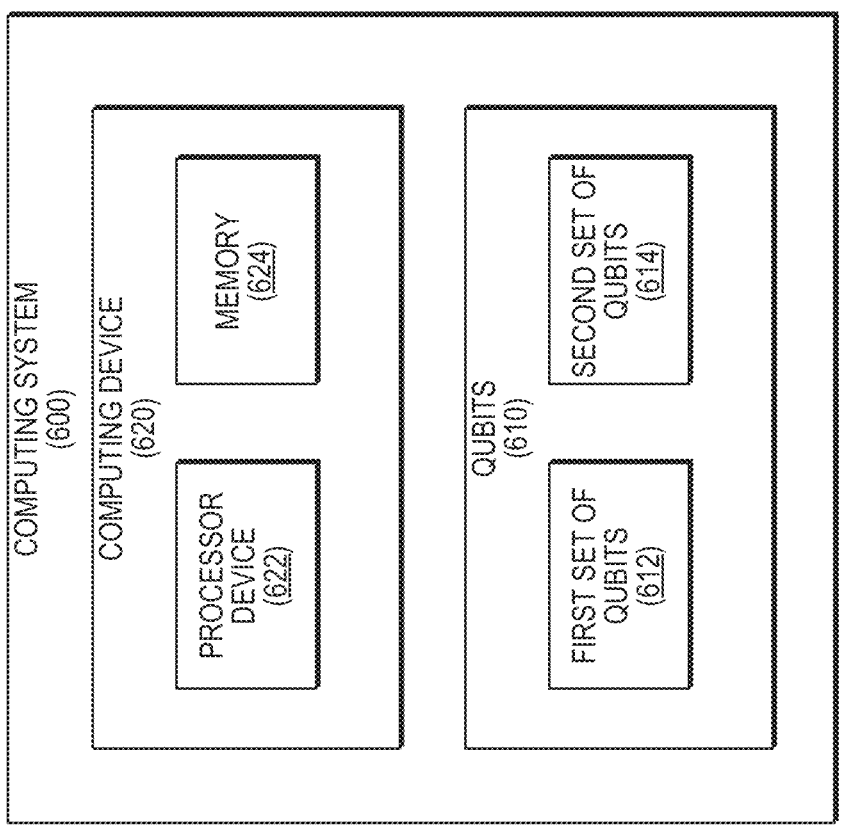
FIG. 6 is a block diagram of a computing system suitable for implementing examples.

FIG. 6 is a block diagram of a computing system 600 suitable for implementing examples. Computing system 600 may be a classical computing system, a quantum computing system, and/or a combination thereof. Computing system 600 includes a computing device 620 and qubits 610. Computing device 620 may be a classical computing device, a quantum computing device, or a combination of classical and quantum components that comprise a classical computing device and/or a quantum computing device. As such, computing device 620 includes a processor device 622 and a memory 624. Processor device 622 may be quantum processor device, and thus may be similar to quantum processor device 112 of FIG. 1A and/or quantum processor device 122 of FIG. 1A. In other implementations, processor device 622 may be a classical processor device. Computing device 620 may be similar to the first QCD 110 of FIG. 1A, second QCD 120 of FIG. 1A, and/or quantum computing device 600 of FIG. 6. Qubits 610 may include a first set of qubits 612 and a second set of qubits 614.

In various implementations, the processor device 622 is communicatively coupled to the memory 624.

Figure 7:
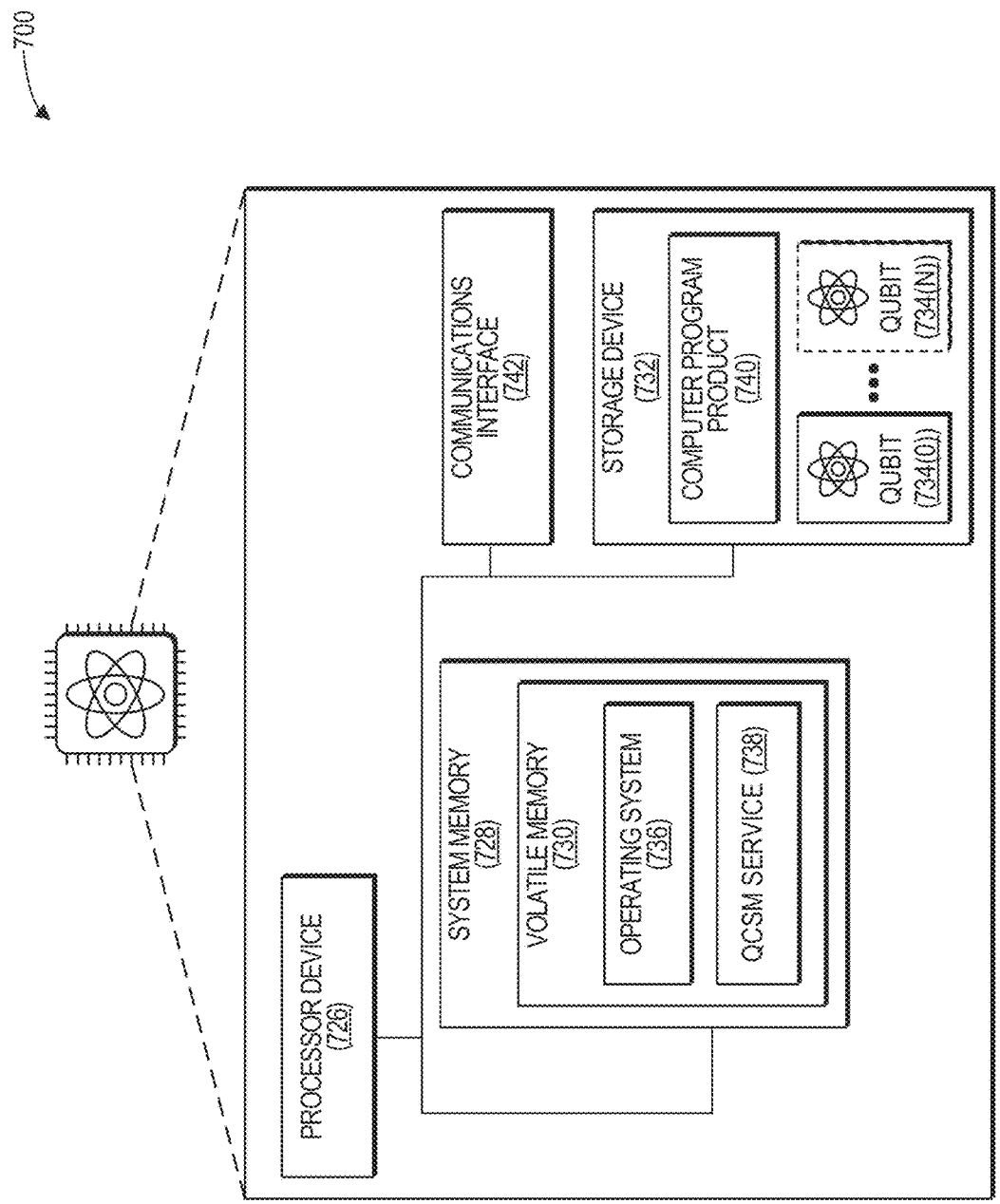
FIG. 7 is a block diagram of a quantum computing device suitable for implementing examples.

FIG. 7 is a block diagram of a quantum computing device 700 suitable for implementing examples. Quantum computing device 700 may be similar to quantum computing device 110 of FIG. 1A and/or quantum computing device 120 of FIG. 1A. The quantum computing device 700 may comprise any suitable quantum computing device or devices. The quantum computing device 700 can operate using classical computing principles or quantum computing principles. When using quantum computing principles, the quantum computing device 700 performs computations that utilize quantum-mechanical phenomena, such as superposition and entanglement. The quantum computing device 700 may operate under certain environmental conditions, such as at or near zero degrees (0°) Kelvin. When using classical computing principles, the quantum computing device 700 utilizes binary digits that have a value of either zero (0) or one (1).

The quantum computing device 700 includes a processor device 726 and a system memory 728. The processor device 726 can be any commercially available or proprietary processor suitable for operating in a quantum environment. The system memory 728 may include volatile memory 730 (e.g., random-access memory (RAM)). The quantum computing device 700 may further include or be coupled to a non-transitory computer-readable medium such as a storage device 732. The storage device 732 and other drives associated with computer-readable media and computer-usable media may provide non-volatile storage of data, data structures, computer-executable instructions, and the like. The storage device may also provide functionality for storing one or more qubits 734(0)-734(N).

A number of modules can be stored in the storage device 732 and in the volatile memory 730, including an operating system 736 and one or more modules, such as a QCSM service 738. All or a portion of the examples may be implemented as a computer program product 640 stored on a transitory or non-transitory computer-usable or computer-readable medium, such as the storage device 732, which includes complex programming instructions, such as complex computer-readable program code, to cause the processor device 726 to carry out the steps described herein. Thus, the computer-readable program code can comprise computer-executable instructions for implementing the functionality of the examples described herein when executed on the processor device 726.

An operator may also be able to enter one or more configuration commands through a keyboard (not illustrated), a pointing device such as a mouse (not illustrated), or a touch-sensitive surface such as a display device (not illustrated). The quantum computing device 700 may also include a communications interface 742 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
receiving, by a computing device, a first signal that indicates a request for a teleportation event between a first quantum computing system (QCS) and a second QCS, wherein a first set of qubits is associated with the first QCS and a second set of qubits is associated with the second QCS;
in response to receiving the first signal, causing, by the computing device, an allocation of a first qubit of the first set of qubits for the teleportation event;
in response to receiving the first signal, causing, by the computing device, an allocation of a second qubit of the second set of qubits for the teleportation event;
receiving, at the computing device, a second signal that indicates a successful completion of the teleportation event; and
in response to receiving the second signal, causing, by the computing device, a deallocation of the first qubit of the first set of qubits.

2. The method of claim 1, further comprising:
in response to receiving a third signal that indicates a request to initiate the teleportation event, causing, by the computing device, a quantum entanglement of the first qubit and the second qubit.

3. The method of claim 2, wherein causing the quantum entanglement of the first qubit and the second qubit comprises:
causing, by the computing device, a preparation of an entangled qubit system that includes the first qubit and the second qubit, such that a quantum state of the entangled qubit system is in a Bell state.

4. The method of claim 1, further comprising:
in response to receiving the first signal, causing, by the computing device, an allocation of a payload qubit of the first set of qubits for the teleportation event;
causing, by the computing device and at the first QCS, a preparation of the payload qubit such that a quantum state of the prepared payload qubit is in a payload quantum state that is to be teleported to the second qubit associated with the second set of qubits; and
in response to receiving the second signal, causing, by the computing device, a deallocation of the payload qubit of the first set of qubits.

5. The method of claim 1, further comprising:
causing, by the computing device and at the first QCS, a quantum entanglement of the first qubit and a payload qubit of the first set of qubits.

6. The method of claim 5, further comprising:
causing, by the computing device and at the first QCS, a first measurement on the first qubit, wherein the first measurement is associated with a first quantum state of the first qubit;
causing, by the computing device and at the first QCS, a second measurement on the payload qubit, wherein the second measurement is associated with a second quantum state of the payload qubit;
causing, by the computing device and at the first QCS, a generation of a data structure that encodes the first measurement on the first qubit and the second measurement on the payload qubit; and
causing, by the computing device, a transmission of the data structure.

7. The method of claim 1, further comprising:
causing, by the computing device and at the second QCS, a sequence of quantum operations on the second qubit such that a quantum state of the second qubit is a payload quantum state of a payload qubit of the first set of qubits, wherein the sequence of quantum operations is based on a first measurement on the first qubit and a second measurement on the payload qubit.

8. The method of claim 1, further comprising:
receiving, by the computing device, the first signal that indicates the request for a quantum teleportation event, wherein the request for the teleportation event originated at a client device that is a client of a teleportation service.

9. The method of claim 1, further comprising:
receiving, by the computing device, the first signal that indicates the request for a quantum teleportation event, wherein the teleportation event is a predicted teleportation event based on a pattern of previous requests for previous quantum teleportation operations, and the request is a predicted request for the predicted teleportation event.

10. The method of claim 9, further comprising:
training a teleportation prediction model based on training data that encodes the previous requests for previous quantum teleportation operations.

11. The method of claim 9, further comprising:
predicting, by a trained teleportation prediction model, the predicted teleportation event;
generating, by a teleportation prediction service, the first signal that indicates the predicted request for the predicted teleportation event; and
causing, by the teleportation prediction service, a transmission of the first signal from the teleportation prediction service to the computing device.

12. The method of claim 1, further comprising:
in response to the allocation of the first qubit and the second qubit for the teleportation event, causing, by the computing device, a generation of a first record and a second record in at least one qubit registry, wherein the first record encodes a first indication that indicates the allocation of the first qubit for the teleportation event and the second record encodes a second indication that indicates the allocation of the second qubit for the teleportation event; and
in response to the deallocation of the first qubit for the teleportation event, causing, by the computing device, a generation of a third record in the at least one qubit registry, wherein the third record encodes a third indication of the deallocation of the first qubit.

13. The method of claim 1, further comprising:
in response to receiving the first signal, causing, by the computing device, a selection of the first qubit from the first set of qubits based on at least one qubit allocation table of at least one qubit registry, wherein the at least one qubit allocation table indicates that the first qubit is currently unallocated;
in response to the selection of the first qubit, causing, by the computing device, the allocation of the currently unallocated first qubit of the first set of qubits for the teleportation event;
in response to receiving the first signal, causing, by the computing device, a selection of the second qubit from the second set of qubits based on the at least one qubit allocation table of the at least one qubit registry, wherein the at least one qubit allocation table indicates that the second qubit is currently unallocated; and
in response to the selection of the second qubit, causing, by the computing device, the allocation of the currently unallocated second qubit of the second set of qubits for the teleportation event.

14. The method of claim 13, wherein the at least one qubit registry includes a first qubit registry associated with the first QCS and a second qubit registry associated with the second QCS, and the at least one qubit allocation table includes a first qubit allocation table of the first qubit registry and a second qubit allocation table of the second qubit registry, and wherein the method further comprises:
causing, by the computing device, a generation of a first record in the first qubit allocation table, wherein the first record in the first qubit allocation table indicates the allocation of the first qubit for the teleportation event; and
causing, by the computing device, a generation of a second record in the second qubit allocation table, wherein the second record in the second qubit allocation table indicates the allocation of the second qubit for the teleportation event.

15. The method of claim 13, further comprising:
causing, by the computing device, an update to the at least one allocation table that indicates the allocation of the first qubit for the teleportation event and the allocation of the second qubit for the teleportation event, a first address associated with the first qubit, a second address associated with the second qubit, and a one-to-one map between the first address associated with the first qubit and the second address of the second qubit.

16. The method of claim 1, further comprising:
in response to receiving the first signal, causing, by the computing device, a selection of the payload qubit from the first set of qubits based on at least one qubit allocation table of at least one qubit registry, wherein the at least one qubit allocation table indicates that the payload qubit is currently unallocated;
in response to the selection of the payload qubit, causing, by the computing device, an allocation of the currently unallocated payload qubit of the first set of qubits for the teleportation event; and
in response to the allocation of the payload qubit, causing, by the computing device, a preparation of the payload qubit such that a quantum state of the prepared payload qubit is in a payload quantum state that is to be teleported to the second qubit associated with the second set of qubits.

17. The method of claim 1, wherein the request for the teleportation event indicates a selection of the first QCS from a set of QCS, a selection of the second QCS from the set of the QCS, and a selection of a payload qubit from the first set of qubits.

18. The method of claim 1, further comprising:
in response to receiving the first signal, causing, by the computing device, a selection of the first QCS from a set of QCSs based on at least one qubit allocation table indicating that a subset of the first set of qubits is currently unallocated; and
in response to receiving the first signal, causing, by the computing device, a selection of the second QCS from the set of QCSs based on the at least one qubit allocation table indicating that a subset of the second set of qubits is currently unallocated.

19. A computing system, comprising a computing device comprising:
  a memory; and
  a processor device coupled to the memory to:
    receive a first signal that indicates a request for a teleportation event between a first quantum computing system (QCS) and a second QCS, wherein a first set of qubits is associated with the first QCS and a second set of qubits is associated with the second QCS;
    in response to receiving the first signal, cause an allocation of a first qubit of the first set of qubits for the teleportation event;
    in response to receiving the first signal, cause an allocation of a second qubit of the second set of qubits for the teleportation event;
    receive a second signal that indicates a successful completion of the teleportation event;
    in response to receiving the second signal, cause a deallocation of the first qubit of the first set of qubits; and
    in response to receiving the second signal, cause a deallocation of the second qubit of the first set of qubits.

20. A non-transitory computer-readable storage medium that includes executable instructions to cause a processor device to:
  receive a first signal that indicates a request for a teleportation event between a first quantum computing system (QCS) and a second QCS, wherein a first set of qubits is associated with the first QCS and a second set of qubits is associated with the second QCS;
  in response to receiving the first signal, cause an allocation of a first qubit of the first set of qubits for the teleportation event;
  in response to receiving the first signal, cause an allocation of a second qubit of the second set of qubits for the teleportation event;
  receive a second signal that indicates a successful completion of the teleportation event;
  in response to receiving the second signal, cause a deallocation of the first qubit of the first set of qubits; and
  in response to receiving the second signal, cause a deallocation of the second qubit of the first set of qubits.

* * * * *